US010437650B2

(12) United States Patent
Kobori

(10) Patent No.: US 10,437,650 B2
(45) Date of Patent: Oct. 8, 2019

(54) CONTROLLING EXECUTION OF TASKS IN A SERIES OF OPERATIONAL PROCESSING BY IDENTIFYING PROCESSING UNITS BASED ON TASK COMMAND, TASK SETTING INFORMATION, STATE OF OPERATIONAL PROCESSING

(71) Applicant: NEC Corporation, Tokyo (JP)

(72) Inventor: Tomoyoshi Kobori, Tokyo (JP)

(73) Assignee: NEC Corporation, Tokyo (JP)

( * ) Notice: Subject to any disclaimer, the term of this patent is extended or adjusted under 35 U.S.C. 154(b) by 121 days.

(21) Appl. No.: 15/318,850

(22) PCT Filed: Jun. 11, 2015

(86) PCT No.: PCT/JP2015/002924
§ 371 (c)(1),
(2) Date: Dec. 14, 2016

(87) PCT Pub. No.: WO2015/194133
PCT Pub. Date: Dec. 23, 2015

(65) Prior Publication Data
US 2017/0147411 A1    May 25, 2017

(30) Foreign Application Priority Data
Jun. 19, 2014  (JP) .................................. 2014-125942

(51) Int. Cl.
*G06F 9/52* (2006.01)
*G06F 9/48* (2006.01)
(Continued)

(52) U.S. Cl.
CPC .................. *G06F 9/52* (2013.01); *G06F 9/38* (2013.01); *G06F 9/54* (2013.01); *G06T 1/20* (2013.01);
(Continued)

(58) Field of Classification Search
None
See application file for complete search history.

(56) References Cited

U.S. PATENT DOCUMENTS 5,361,363 A * 11/1994 Wells ...................... G06F 11/08
712/16
6,154,829 A  11/2000 Mino et al.
(Continued)

FOREIGN PATENT DOCUMENTS

JP  H11-191096 A  7/1999
JP  2001-022595 A  1/2001
(Continued)

OTHER PUBLICATIONS

International Search Report, corresponding to PCT/JP2015/002924, dated Sep. 8, 2015, 1 page.
(Continued)

Primary Examiner — Abu Zar Ghaffari
(74) Attorney, Agent, or Firm — Wilmer Cutler Pickering Hale and Dorr LLP

(57) ABSTRACT

Provided is a processing apparatus, including: a plurality of processing unit; at least one or more data buffers that are connected between a first processing unit and a second processing unit and is able to store data output from the first processing unit and data input to the second processing unit; a command buffer that stores a task command specifying execution of a task to be executed in one or more specific processing units, the command buffer being able to output the task command to the processing unit; and a task control unit that is configured to control operational processing in the task, by controlling at least one of the data buffer and the command buffer, on the basis of the task command, task setting information representing the processing unit in which
(Continued)

the task is executed, and information representing a state of operational processing in respective processing unit.

9 Claims, 19 Drawing Sheets

(51) Int. Cl.
    *G06F 9/38*     (2018.01)
    *G06F 9/54*     (2006.01)
    *G06T 1/20*     (2006.01)
    *G06F 9/50*     (2006.01)

(52) U.S. Cl.
    CPC .............. *G06F 9/48* (2013.01); *G06F 9/4881* (2013.01); *G06F 9/5066* (2013.01)

(56) References Cited

U.S. PATENT DOCUMENTS

| | | | | |
|---|---|---|---|---|
| 6,775,756 B1 * | 8/2004 | Thusoo | ................ | G06F 9/3834 711/140 |
| 7,644,220 B2 * | 1/2010 | Moriyama | ........... | G05B 19/054 710/104 |
| 7,908,603 B2 * | 3/2011 | Klingman | ............. | G06F 9/4881 712/14 |
| 8,972,699 B2 * | 3/2015 | Lin | ......................... | G06F 9/505 712/34 |
| 9,823,946 B2 * | 11/2017 | Kurata | .................. | G06F 9/3851 |
| 9,965,322 B2 * | 5/2018 | Woo | ..................... | G06F 9/5044 |
| 2006/0061579 A1 * | 3/2006 | Washizu | ................. | G06F 9/461 345/503 |
| 2006/0251092 A1 * | 11/2006 | Matterne | ............... | G06F 9/3877 370/412 |
| 2006/0265535 A1 * | 11/2006 | Ohtsuka | ................ | G06F 9/4812 710/260 |
| 2007/0124563 A1 * | 5/2007 | Sekiyama | ............. | G06F 9/5011 712/36 |
| 2008/0056598 A1 * | 3/2008 | Murakata | ........... | G06K 9/00973 382/254 |
| 2009/0210676 A1 * | 8/2009 | Luick | .................... | G06F 9/3824 712/220 |
| 2010/0095302 A1 * | 4/2010 | Kato | ..................... | G06F 9/5066 718/104 |
| 2011/0115802 A1 * | 5/2011 | Mantor | ................. | G06F 9/5027 345/520 |
| 2012/0246653 A1 * | 9/2012 | Boruhovski | ............ | G06F 9/541 718/102 |
| 2013/0160017 A1 * | 6/2013 | Hartog | ................. | G06F 9/4881 718/103 |
| 2014/0204103 A1 * | 7/2014 | Beer-Gingold | ....... | G06F 9/4881 345/522 |

FOREIGN PATENT DOCUMENTS

| | | | |
|---|---|---|---|
| JP | 2003-067156 A | 3/2003 | |
| JP | 2014-102692 A | 6/2014 | |
| WO | WO-2008046716 A1 * | 4/2008 | ........... G06F 9/4881 |
| WO | WO-2012/039216 A1 | 3/2012 | |
| WO | WO-2013/030630 A1 | 3/2013 | |

OTHER PUBLICATIONS

Japanese Notice of Reasons for Refusal issued in Japanese Patent Application No. 2016-529022, dated Jul. 30, 2019, 7 pages.

* cited by examiner

Fig. 2

| TASK IDENTIFIER 203 | START PROCESSING-NODE NUMBER 201 | END PROCESSING-NODE NUMBER 202 |
|---|---|---|
| TASK A | #0 | #2 |
| TASK B | #1 | #2 |
| ... | ... | ... |
| TASK N | #0 | #2 |

Fig. 3

| TASK IDENTIFIER 301 | PREVIOUS-TASK DEPENDENCY INFORMATION 302 | NEXT-TASK DEPENDENCY INFORMATION 303 |
|---|---|---|

Fig. 6

| TASK IDENTIFIER | START PROCESSING-NODE NUMBER | END PROCESSING-NODE NUMBER |
|---|---|---|
| TASK A | #0 | #2 |
| TASK B | #1 | #2 |

Fig. 10

| TASK IDENTIFIER 203 | START PROCESSING-NODE NUMBER 201 | PROCESSING-NODE COUNT 1002 |
|---|---|---|
| TASK A | #0 | 2 |
| TASK B | #1 | 1 |
| ... | ... | ... |
| TASK N | #0 | 2 |

CONTROLLING EXECUTION OF TASKS IN A SERIES OF OPERATIONAL PROCESSING BY IDENTIFYING PROCESSING UNITS BASED ON TASK COMMAND, TASK SETTING INFORMATION, STATE OF OPERATIONAL PROCESSING

CROSS-REFERENCE TO RELATED APPLICATIONS

This application is a national stage application of International Application No. PCT/JP2015/002924 entitled "Arithmetic Device, Arithmetic Device Control Method, and Storage Medium in Which Arithmetic Device Control Program is Recorded," filed on Jun. 11, 2015, which claims the benefit of priority from Japanese Patent Application No. 2014-125942, filed on Jun. 19, 2014, the disclosures of which are incorporated herein in their entirety by reference thereto.

TECHNICAL FIELD

The present invention relates to a processing device and the like that is capable of controlling execution of a task, which is a series of operational processing in one or more processing units, with respect to each processing unit.

BACKGROUND ART

In data processing, such as signal processing, a large amount of data (for example, stream data of a specific signal) is dealt with as a subject of operational processing. In some case, a plurality of types of operational processing (for example, FFT (Fast Fourier Transform) and various types of filtering) are executed for such a large amount of data sequentially.

In such data processing, the operational processing may be individually achieved by dedicated hardware, a processor (processing device), such as a DSP (Digital Signal Processor), and the like. Similarly, the operational processing may be achieved by a combination of general-purpose hardware, such as a computer, and software (computer program). Hereinafter, various components that can execute operational processing as described above may be collectively referred to as "processing blocks" or "processing units".

There is a known configuration that an upper-level control module (controller), which is able to control the processing blocks, arranges a series of operational processing, being executed in one or more the processing blocks, into a task and controls execution of the task in the respective processing blocks, when the processing device executes data processing as described above. Such a task includes operational processing on data executed by one or more processing blocks.

For example, there is a case where a configuration exemplified in FIG. 20 is used, when constructing a processing flow (the processing flow represents a series of operational processing), by connecting a plurality of processing blocks so that processing results (outputs) from one processing block are supplied to another processing block. In this case, a plurality of processing blocks (processing blocks 2001 to 2003) is connected through data buffers (data buffers 2004 to 2005). Operational processing executed by the plurality of processing blocks is collectively controlled as the task. That is, the plurality of processing blocks and data buffers are connected like a pipeline form, and the task is executed by the pipeline. Those data buffers are storage areas. Various data are output to the data buffers, from processing blocks connected to the data buffers. Various data are input to processing blocks from the data buffers.

Since the configuration exemplified in FIG. 20 enables to enlarge granularity of task control, a processing load for controlling execution of a task can be reduced. Since latency (delay) in memory access in the respective processing blocks can be reduced by use of data buffers, an improvement can be expected in efficiency of operational processing.

Relating to a technique for executing data processing using a plurality of processing blocks, the following patent literatures have been disclosed.

PTL1 discloses a technique for reducing overheads of access to buffers that are used for handing data between the tasks, for an information processing apparatus that executes a plurality of tasks having dependencies with each other. The technique disclosed in PTL1 reduces delay in buffer access by exchanging data through an internal memory arranged inside a processor (processing block). The technique disclosed in PTL1 also controls the order of execution of tasks so that a plurality of tasks having dependencies with each other are processed continuously.

PTL2 discloses a technique for a printing apparatus configured with a multiprocessor, to interpret a print command including a plurality of pages and to assign image-drawing processing and printing processing for respective pages to a plurality of separate processors successively.

PTL3 discloses a technique for increasing the processing efficiency of processing blocks while maintaining real-time processing, by controlling the execution sequence of tasks and allocation of execution time for each task, based of connection between tasks.

CITATION LIST

Patent Literature

[PTL1] PCT International Publication No. WO 2012/039216 A
[PTL2] Japanese Unexamined Patent Application Publication No. 2003-067156
[PTL3] Japanese Unexamined Patent Application Publication No. JP 2001-022595

SUMMARY OF INVENTION

Technical Problem

When a simple configuration as exemplified in FIG. 20 is employed, the respective processing blocks are configured to, for example, execute a task next to particular task, after all the operation processing in the particular task has finished, as schematically exemplified in FIG. 21. More specifically, the respective processing blocks do not execute processing in a task 2 until all the operational processing in a task 1 is finished, as exemplified in FIG. 21.

In this case, there may exist a processing block in which no operational processing is executed (the processing block is in an idle state) during a period from completion of a task to start of a next task. More specifically, there may be a processing block being in idle state, at an end portion or a start portion of the task. Such an idle state of a processing block becomes a bottleneck when attempting to increasing overall operational processing speeded. In other words, in processing blocks connected in a pipeline form, overheads of the pipeline caused by execution of a plurality of tasks decreases the operating rates of the respective processing blocks. A decrease in the operating rates of the processing blocks as described above causes a bottleneck for the overall operational processing.

As a measure to such a problem, for example, a method for reducing units of processing for a task (reducing granularity) is conceivable. That is, the method for reducing execution time for per unit task and therefore reducing idle state of the processing blocks, by downsizing units of processing for the task. Alternatively, for example, a method for reducing a ratio of the overheads of the pipeline for the processing of a task, by enlarging units of processing for a task (enlarging granularity), is conceivable.

However, when units of processing for a task are reduced, a processing load for controlling execution of a task increases. When a control system for controlling execution of a task has a low processing capability, there is a possibility that scheduling of tasks cannot be completed in time, due to the increase in the processing load.

When units of processing for a task are enlarged, the sizes of data buffers need to be enlarged in accordance with the enlarged units of processing, and that causes a problem such as increase in the size of a circuit, and the like.

The PTL1 discloses only a technique for collectively processing tasks having dependencies in an identical processor (processing block). PTL2 is only a technique for a plurality of processors to execute independently image-drawing processing which is independent with respect to each page and to execute printing processing of image-drawing results in parallel. Since, in particular, the printing processing repeats certain determined types of processing (paper feed, print, paper ejection), improvement in processing efficiency is relatively easy. PTL3 discloses only a technique for changing an execution order of tasks and allocation of execution time for each task in a specific processor based on connection relations between tasks and requirement for a real time feature with respect to each task. Consequently, in any of the patent literatures, a technique for improving the operating rates of a plurality of processing blocks connected in a pipeline form, when various different tasks are executed, is not considered.

The present invention is made in consideration of the above-described situations. That is, one of major objects of the present invention is to provide a processing device (or a processing system) that is configured to include a plurality of processing blocks (processing units) being connected in a pipeline form and to control execution of tasks so that the respective processing blocks can operate efficiently.

Solution to Problem

To achieve the object, a processing apparatus according to one aspect of the present invention includes: a plurality of processing means for executing operational processing on data; at least one or more data buffers that are connected between a first processing means and a second processing means among the plurality of processing means and are capable of storing data output from the first processing means and data input to the second processing means; a command buffer that stores a task command specifying execution of a task that is a series of operational processing on the data, the task being executed in one or more specific processing means that are at least any of one or more the first processing means and one or more the second processing means, the command buffer being able to output the task command to the processing means; and a task control means for controlling operational processing in the task that is executed in one or more specific processing means, by controlling at least one of the data buffer and the command buffer, on the basis of the task command, task setting information that enables to identify the processing means in which the task is executed, and information that represents a state of operational processing in respective processing means and is acquired from respective ones of the plurality of processing means.

A control method of a processing apparatus according to another aspect of the present invention includes: on the basis of, a task command specifying execution of a task that is a series of operational processing on data, the task being executed in one or more specific processing means that are at least any of one or more first processing means and one or more second processing means, both of which are processing means for executing operational processing on the data, information that enables to identify the one or more specific processing means in which the task is executed, and information that is acquired from respective ones of a plurality of processing means and represents a processing state of the processing means, by controlling at least one of one or more data buffers that are connected between the first processing means and the second processing means and are capable of storing data output from the first processing means and data input to the second processing means, and a command buffer that stores the task command and is able to output the task command to the one or more specific processing means, controlling operational processing in the task that is executed in the one or more specific processing means.

The object of the present invention can be also achieved by a computer program that implements the control method of a processing device including the above-described configuration by a computer and a computer-readable storage medium storing (recording) the computer program.

Advantageous Effects of Invention

The present invention enables a processing device configured to include a plurality of processing blocks being connected in a pipeline form to control execution of tasks so that the respective processing blocks can operate efficiently.

BRIEF DESCRIPTION OF DRAWINGS

FIG. 2 is a diagram exemplifying contents of a task setting table according to the first example embodiment of the present invention;

FIG. 3 is a diagram exemplifying contents of a task command according to the first example embodiment of the present invention;

FIG. 6 is a diagram illustrating a specific example of a task setting table according to the first example embodiment of the present invention;

FIG. 10 is a diagram exemplifying contents of a task setting table according to a second example embodiment of the present invention;

DESCRIPTION OF EMBODIMENTS

In the following, example embodiments of the present invention will be described in detail with reference to the accompanying drawings. Configurations described in the following example embodiments are presented for exemplification purpose only, and the technical scope of the present invention is not limited thereto.

First Example Embodiment

Hereinafter, a first example embodiment of the present invention will be described.

Figure 1:
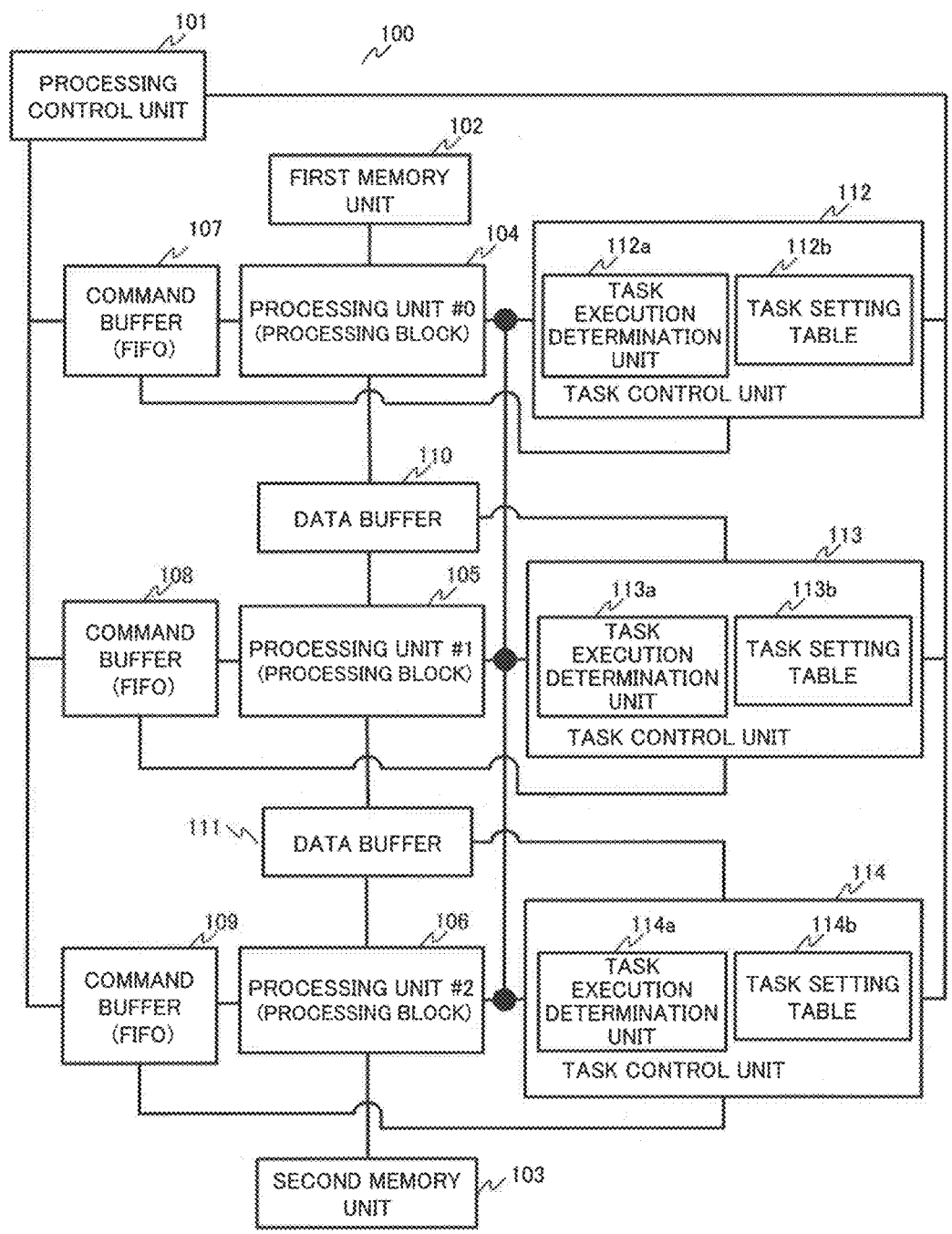
FIG. 1 is a diagram exemplifying a functional configuration of a processing device according to a first example embodiment of the present invention.

First, a processing device in the present example embodiment will be described with reference to FIG. 1. FIG. 1 is a block diagram exemplifying a functional configuration of the processing device in the present example embodiment.

As exemplified in FIG. 1, a processing device 100 in the present example embodiment includes a processing control unit 101, a first memory unit 102 that stores data to be used for operational processing, and a second memory unit 103 that stores processing results. The processing device 100 in the present example embodiment also includes processing units (processing blocks) 104 to 106 that executes various operational processing, according to input data, and various control signals (for example, a task command, which will be described later) input from the processing control unit 101.

The processing control unit 101 in the present example embodiment supplies a control signal instructing the processing units (104 to 106) to execute a task. More specifically, the processing control unit 101 arranges a series of operational processing in the processing units (104 to 106) into a task, and generates a command (task command) specifying execution of the task. The processing control unit 101 supplies the task command to the processing units (104 to 106).

The processing units 104 and 105 in the present example embodiment are similar to the processing blocks described above. Each of the processing units (104 to 106) may be a dedicated processing hardware (DSP) or the like, which executes specific processing. Alternatively, each of the processing units (104 to 106) may be a general-purpose CPU (Central Processing Unit) or MPU (Micro Processing Unit). Types of operational processing to be executed in the processing units (104 to 106) may be defined in any manner.

The processing device 100 in the present example embodiment includes command buffers (command buffers 107, 108, and 109) that store control signals input from the processing control unit 101 to the processing units (104 to 106). Each of the command buffers (107 to 109) may be configured, for example, into any temporary storage device in which a FIFO (First IN First OUT) configuration may be implemented. In the present example embodiment, hereinafter, the command buffers 107, 108, and 109 may be referred to as FIFOs 107, 108, and 109, respectively. The present example embodiment is not limited to the above-described configuration, and a configuration other than a FIFO may be employed for the command buffers 107 to 109.

The command buffers (107 to 109) in the present example embodiment can be implemented by, for example, known volatile memories (for example, DRAMs (Dynamic Random Access Memory) and SRAMs (Static Random Access Memory)) and controllers or the like that control the memories. The memories may be configured as dual port memories.

The processing device 100 in the present example embodiment includes data buffers 110 and 111 that are arranged between the respective processing units (104 to 106).

The data buffer 110 is connected between the output side of the preceding processing unit 104 and the input side of the succeeding processing unit 105 and stores results of processing in the processing unit 104. The data buffer 110 is able to transfer results of processing in the preceding processing unit 104 to the succeeding processing unit 105.

The data buffer 111 is connected between the output side of the preceding processing unit 105 and the input side of the succeeding processing unit 106 and stores results of processing in the processing unit 105. The data buffer 111 is able to transfer results of processing in the preceding processing unit 105 to the succeeding processing unit 106. The data buffers 110 and 111 in the present example embodiment can be implemented by, for example, known volatile memories (for example, DRAMs and SRAMs) and controllers or the like that control the memories. The memories may be configured as dual port memories.

The processing device 100 in the present example embodiment includes task control units (task control units 112, 113, and 114) that are able to control output of various data and the like from the FIFOs (107 to 109) and the data buffers (110 and 111). Specific configurations and operations of the task control units (112 to 114) will be described later.

Hereinafter, connections among the above-described respective elements will be described.

The processing control unit 101 is communicatively connected to the FIFOs (107 to 109) and the task control units (112 to 114).

The processing unit 104 is communicatively connected to the FIFO 107 and acquires (receives) various control signals (for example, the above-described command) and the like from the FIFO 107.

The processing unit 104 is communicatively connected to the first memory unit 102. The processing unit 104 may acquire data to be object of operational processing from the first memory unit 102.

The processing unit 104 is communicatively connected to the data buffer 110 and is able to acquire a state of the data buffer 110. The processing unit 104 outputs results of operational processing in the processing unit 104 to the data buffer 110.

The processing unit 104 is communicatively connected to each of the task control units (112 to 114). The processing unit 104 notifies the task control units (112 to 114) of status information that represents an execution state of operational processing in a task. In this case, the processing unit 104 may transmit a signal representing the status information using, for example, a signal line in any communication bus connecting the processing unit 104 and the respective task control units (112 to 114).

The processing unit 105 is communicatively connected to the FIFO 108. The processing unit 105 acquires (receives) various control signals (for example, the above-described command) from the FIFO 108.

The processing unit 105 is communicatively connected to the data buffer 110 and acquires data to be used for operational processing from the data buffer 110.

The processing unit 105 is communicatively connected to the data buffer 111 and is able to acquire a state of the data buffer 111. The processing unit 105 outputs results of operational processing in the processing unit 105 to the data buffer 111.

The processing unit 105 is communicatively connected to each of the task control units (112 to 114). The processing unit 105 notifies the task control units (112 to 114) of status information as described above. In this case, the processing unit 105 may transmit a signal representing the status information using, for example, a signal line in any communication bus connecting the processing unit 105 and the respective task control units (112 to 114).

The processing unit 106 is communicatively connected to the FIFO 109. The processing unit 106 acquires (receives) various control signals (for example, the above-described command) from the FIFO 109.

The processing unit 106 is communicatively connected to the data buffer 111 and acquires data to be used for operational processing from the data buffer 111.

The processing unit 106 is communicatively connected to the second memory unit 103 and outputs results of operational processing in the processing unit 106 to the second memory unit 103.

The processing unit 106 is communicatively connected to each of the task control units (112 to 114). The processing unit 106 notifies the task control units (112 to 114) of status information as described above. In this case, the processing unit 106 may transmit a signal representing the status information using, for example, a signal line in any communication bus connecting the processing unit 106 and the respective task control units (112 to 114).

The processing unit 104 may be connected communicatively to the second memory unit 103 in a communicative manner. The processing unit 105 may be communicatively connected to the first memory unit 102 and the second memory unit 103 in a communicative manner. The processing unit 106 may be communicatively connected to the first memory unit 102 in a communicative manner.

The task control units (112 to 114) are communicatively connected to the processing control unit 101, as described above, and receive various control signals (for example, the above-described command) from the processing control unit 101.

The task control units (112 to 114) are communicatively connected to the processing units (104 to 106), respectively as described above, and acquire status information of operational processing in the respective processing units. In this case, the task control units (112 to 114) may receive notifications of the status information from the respective processing units (104 to 106) or inquire the respective processing units (104 to 106) of the status information.

The task control unit 112 is communicatively connected to the FIFO 107 and is able to control output of data from the FIFO 107 to the processing unit 104.

The task control unit 113 is communicatively connected to the FIFO 108 and is able to control output of data from the FIFO 108 to the processing unit 105.

The task control unit 113 is communicatively connected to the data buffer 110 and is able to control output of data from the data buffer 110 to the processing unit 105. The task control unit 113 may control access to the data buffer 110 by the processing unit 105.

The task control unit 114 is communicatively connected to the FIFO 109 and is able to control output of data from the FIFO 109 to the processing unit 106.

The task control unit 114 is communicatively connected to the data buffer 111 and is able to control output of data from the data buffer 111 to the processing unit 106. The task control unit 114 may control access to the data buffer 111 by the processing unit 106.

For the purpose of description, in the specific example exemplified in FIG. 1, the first memory unit 102 and the second memory unit 103 are described as separate functional blocks, however, the present example embodiment is not limited to this configuration. That is, the first memory unit 102 and the second memory unit 103 may be integrated into a single entity as a memory unit that has a write port and a read port separately. The first memory unit 102 and the second memory unit 103 may also be integrated into a single entity using a memory that is capable of executing write processing and read processing in an independently by arbitration.

In the present example embodiment, any communication bus or communication network may be employed appropriately as a communication line interconnecting the above-described respective elements constituting the processing device 100. A known technology can be employed for such a communication bus and communication network, and a detailed description thereof will thus be omitted.

FIG. 1 exemplifies a specific example in which the number of processing units is three, however, the present example embodiment is not limited to this configuration. The numbers of processing units, data buffers, command buffers (FIFOs), and task control units to be incorporated may be chosen appropriately based on processing performance required for the processing device and types of required operational processing.

Next, the task control units (112 to 114) will be described in detail. As illustrated in FIG. 1, the task control units (112 to 114) include task execution determination units (task execution determination units 112a, 113a, and 114a), respectively. The task control units (112 to 114) also include task setting tables (task setting tables 112b, 113b, and 114b), respectively.

Hereinafter, the task setting tables (112b to 114b) will be described with reference to FIG. 2.

The task setting tables (112b to 114b) include information that enables to identify a processing unit (any one of the processing units 104 to 106) in which operational processing in a task is executed.

More specifically, a start processing-node number 201 and an end processing-node number 202 are set to the task setting tables (112b to 114b) with respect to each task to be executed. That is, task setting tables includes (112b to 114b) pairs of a start processing-node number 201 and an end processing-node number 202 as many as the number of tasks (the number of types of tasks) to be executed. In the task setting tables (112b to 114b), the start processing-node numbers 201 and end processing-node numbers 202 may be held (set) in association with task identifiers 203 that is used to identify a type of a task. In the specific example exemplified in FIG. 2, a start processing-node number 201 and an end processing-node number 202 are set for each of tasks "A" to "N".

The start processing-node number 201 is information that enables to identify a processing unit (hereinafter, may be referred to as a "start processing-unit") that executes the first operational processing in a task. The end processing-node number 202 is information that enables to identify a processing unit (hereinafter, may be referred to as an "end processing-unit") that executes the last operational processing in a task.

In other words, the start processing-node number 201 is information that indicates the processing unit (start processing-unit) at which the operational processing in a task is started. The end processing-node number is information that indicates the processing unit (end processing-unit) at which the operational processing in a task is finished. That is, with respect to a task, the operational processing in the task is executed by processing units from the start processing-unit specified by the start processing-node number to the end processing-unit specified by the end processing-node number.

Relationships between respective processing-node numbers and actual processing units (104 to 106) may be set to, for example, the task setting tables (112b to 114b) or the task control units (112 to 114) in advance.

The task setting tables (112b to 114b) may be connected to the task execution determination units (the task execution determination units 112a, 113a, and 114a), respectively.

The task setting tables (112b to 114b) provide the task execution determination units (112a to 114a), respectively, with the start processing-node numbers 201 and end processing-node numbers 202. In this case, the task execution determination units (112a to 114a) may refer to the task setting tables (112b to 114b), respectively.

For example, the task setting tables (112b to 114b) may receive the task identifiers from the task execution determination units (112a to 114a). The task setting tables (112b to 114b) may provide the task execution determination units (112a to 114a) with the start processing-node numbers 201 and the end processing-node numbers 202 of tasks corresponding to the received identifiers.

Each of the task execution determination units (112a to 114a) determines whether one of the processing units (104 to 106) that are controlled object being controlled by the task control units (112 to 114) that include the task execution determination unit is able to execute a task. More specifically, each of the task execution determination units (112a to 114a) determines a timing at which the processing unit as controlled object is able to execute the task.

In the present example embodiment, the task control unit 112 handles the processing unit 104 as a processing unit thereof. Similarly, the task control unit 113 handles the processing unit 105 as a processing unit as a controlled object thereof. Similarly, the task control unit 114 handles the processing unit 106 as a processing unit as a controlled object thereof.

The respective task execution determination units (112a to 114a) determine timings at which the respective processing units (the processing units 104 to 106) are able to execute tasks, on the basis of the status information of the respective processing units (the processing units 104 to 106), and the start processing-node numbers and end processing-node numbers provided by the task setting tables. A specific determination method of such timings will be described later. The respective task execution determination units (112a to 114a) in the present example embodiment may communicate with respective constituent elements that are connected to the task control units (112 to 114).

Next, an operation of the processing device 100, which is configured as described above, in the present example embodiment, will be described. In the following description, it is assumed that data used in operational processing in the processing units (104 to 106) are stored in the first memory unit 102.

In the following description, for the convenience of explanation, it is assumed that the number of tasks to be executed is two. It is assumed that, between the two tasks, the first task (hereinafter, may be referred to as "task A") is executed in the processing units 104, 105, and 106, and the second task (hereinafter, may be referred to as "task B") is executed in the processing units 105 and 106.

In the following description, a command that specifies execution of a specific task and provided by the processing control unit 101 is referred to as a "task command". The command, which specifies execution of the "task A" and provided by the processing control unit 101, is referred to as a "task command A". Similarly, the command, which specifies execution of the "task B" and provided by the processing control unit 101 is referred to as a "task command B".

A task command as described above includes a task identifier (an index or the like) 301 that enables to identify a task (the "task A" or B in this case) that is executed by the task command, as exemplified in FIG. 3.

A task command as described above also includes task dependency information that specifies another task having a dependency in terms of execution order with a task (the "task A" or "task B" in this case), which is specified to be executed, by the task command. Specifically, task dependency information includes previous-task dependency information 302 and next-task dependency information 303, as exemplified in FIG. 3.

The previous-task dependency information 302 represents whether a dependency exists between a task specified in a command and another task to be executed before that task. The next-task dependency information represents whether a dependency exists between a task specified in a command and another task to be executed after that task.

Hereinafter, a particular task to which previous-task dependency information is set with regard to a task specified in the task command, may be referred to as a "previous-dependent task". A particular task to which next-task dependency information is set with regard to a task specified in a command as described above, may be referred to as a "next-dependent task". In the task command, any type of data related to execution of a task may be included in addition to a task identifier 301, previous-task dependency information 302, and next-task dependency information 303.

Figure 4:
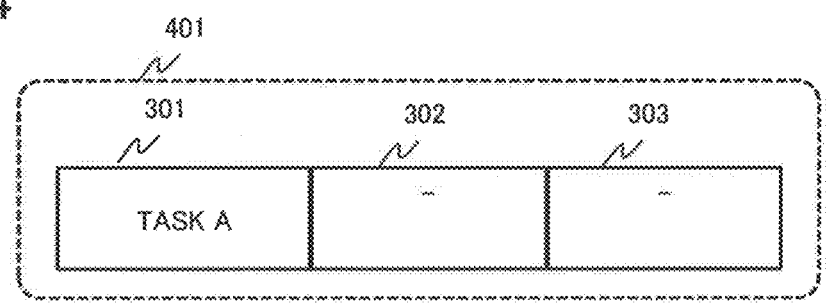
FIG. 4 is a diagram illustrating a specific example of the task command according to the first example embodiment of the present invention.
Figure 4:
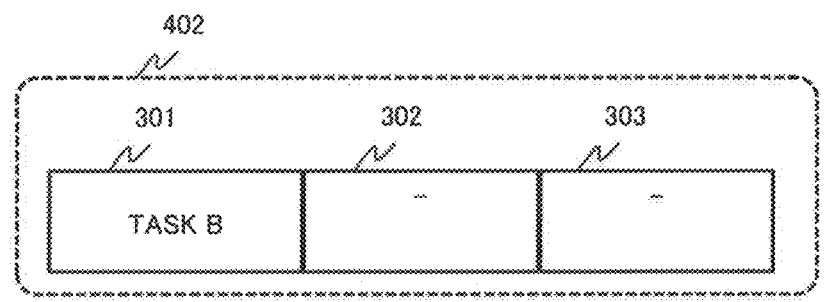
Figure 5:
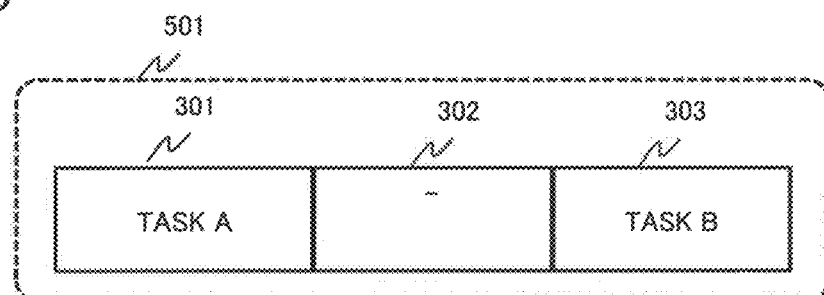
FIG. 5 is a diagram illustrating another specific example of the task command according to the first example embodiment of the present invention.
Figure 5:
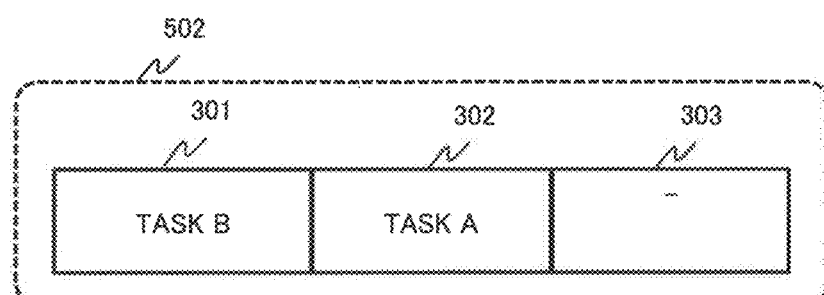

In the following description, it is assumed that the "task command A" and "task command B" exemplified in FIG. 4 or 5 is output from the processing control unit 101.

In the specific example exemplified in FIG. 4, "task A" is set to the "task command A" (401) as a task identifier, and "task B" is set to the "task command B" (402) as a task identifier, respectively. In the specific example exemplified in FIG. 4, task dependency information is set to neither the "task command A" nor "task command B". Due to this setting, the respective processing units (104 to 106) are able to execute operational processing in the "task A" and operational processing in the "task B" independently.

In the specific example exemplified in FIG. 5, "task A" is set to the "task command A" (501) as a task identifier, and "task B" is set to the "task command B" (502) as a task identifier, respectively. The "task B" is set to the task "command A" as a next-task dependency information 303, and the "task A" is set to the task "command B" as previous-task dependency information 302, respectively. In this case, the respective processing units (104 to 106) are required to execute operational processing in the "task B" after having executed operational processing in the "task A".

It is assumed that "#0" and "#2" are stored as start processing-node number and end processing-node number for the "task A", respectively, in the task setting tables (112b to 114b), as exemplified in FIG. 6. It is also assumed that "#1" and "#2" are stored as start processing-node number and end processing-node number for the "task B", respectively, in the task setting tables (112b to 114b) in advance, as exemplified in FIG. 6.

The processing-node numbers "#0", "#1", and "#2" indicate the processing units 104, 105, and 106, respectively. Relationships between processing-node numbers and respective processing units may be set to the task setting tables (112b to 114b) and the task control units (112 to 114) in advance.

In the following description, it is assumed that operational processing in a task is executed sequentially in ascending order of processing-node numbers from a start processing-unit corresponding to a start processing-node number to an end processing-unit corresponding to an end processing-node number. That is, with regard to the "task A", processing in the processing units corresponding to the respective processing-node numbers is executed in the order of the processing-node numbers "#0", "#1", and "#2". With regard to the "task B", processing in the processing units corresponding to the respective processing-node numbers is executed, in the order of the processing-node numbers "#1" and "#2".

Specific processing executed in the respective processing units (104 to 106) with respect to the respective tasks (the "task A" and "task B") may be defined appropriately.

In the following description, status information representing the execution states of operational processing executed in the respective processing units (104 to 106) is supplied from the respective processing units (104 to 106) to the task control units (112 to 114), respectively. Such status information represents "WAITING", "IN PROCESSING", and "PROCESSING FINISHED". In the description below, it is assumed that "0", "1", and "2" are assigned to the status information indicating "WAITING", "IN PROCESSING", and "PROCESSING FINISHED", respectively. The present example embodiment is, however, not limited to the above configuration, and formats representing status information may be defined as appropriate. In the present example embodiment, status information representing states other than "WAITING", "IN PROCESSING", and "PROCESSING FINISHED" with respect to the respective processing units (104 to 106) may also be supplied to the task control units (112 to 114).

Hereinafter, an operation of the processing device 100 in the present example embodiment will be described by mainly referring to operations of the respective task control units (112 to 114).

First, the processing control unit 101 generates commands ("task command A" and "task command B") specifying execution of the "task A" and "task B", respectively. The processing control unit 101 supplies the "task command A" and "task command B" to the FIFOs 107 to 109 and the task control units (112 to 114).

The respective FIFOs 107 to 109 store the "task command A" and "task command B" supplied as input. Similarly, the respective task control units (112 to 114) may store the "task command A" and "task command B" supplied as input.

When the "task command A" is supplied, the respective task control units (112 to 114), in accordance with the steps described below (exemplified in FIGS. 7 to 9), determine whether the processing units (104 to 106), which are processing unit as a controlled object of the respective task control units (112 to 114) respectively, are able to execute the "task A".

When the "task command A" is supplied, the respective task control units (112 to 114) refer to the task setting tables (112b to 114b), which the task control units (112 to 114) include respectively, to acquire information set to the "task A" (step S701). More specifically, the task control units (112 to 114) read the start processing-node number and end processing-node number for the "task A" from the task setting tables (112b to 114b), respectively. In this case, "#0" (corresponding to the processing unit 104) and "#2" (corresponding to the processing unit 106) are set to the start processing-node number 201 and end processing-node number, respectively, for the "task A", as exemplified in FIG. 6.

Next, the respective task control units (112 to 114), on the basis of settings in the task setting tables (112b to 114b), confirm whether the respective processing units (104 to 106) are included in the processing in a task specified in a task command, respectively (step S702). More specifically, each of the task control units (112 to 114), for example, confirms whether one of the processing units (104 to 106) that is controlled object of the task control unit is specified as a processing unit that executes operational processing in the "task A".

As the result of the confirmation in the step S702, when the processing units to be controlled object is determined not to execute operational processing in a task (for example, the "task A") (NO in step S703), the respective task control units (112 to 114) returns to step S701 to execute succeeding processing. In this case, for example, processing may be executed from step S701 with respect to a next task (the "task B" in this case). When processing of all the tasks has been executed, the respective task control units (112 to 114) may wait for input of a next task command from the processing control unit 101.

With regard to the "task A", the respective processing units (104 to 106) are specified as processing units that execute operational processing in the "task A". Therefore, the confirmation by the respective task control units (112 to 114) in step S703 results in "YES" (processing units are "included").

When the confirmation result in the step S703 is "YES", the respective task control units (112 to 114) acquire the status information of the processing units (104 to 106) (step S704). In this case, since the respective processing units (104 to 106) are not executing operational processing at the point of time at which the "task command A" is supplied, the status information of the respective processing units (104 to 106) indicates "WAITING (0)".

Next, the respective task control units (112 to 114), using the status information acquired in step S704, determine whether the respective processing units (104 to 106) are able to execute a task (step S705). More specifically, each of the task control units (112 to 114) determines whether one of the processing units (104 to 106) that are controlled object of the task control unit is able to execute the operational processing in the "task A".

Figure 8:
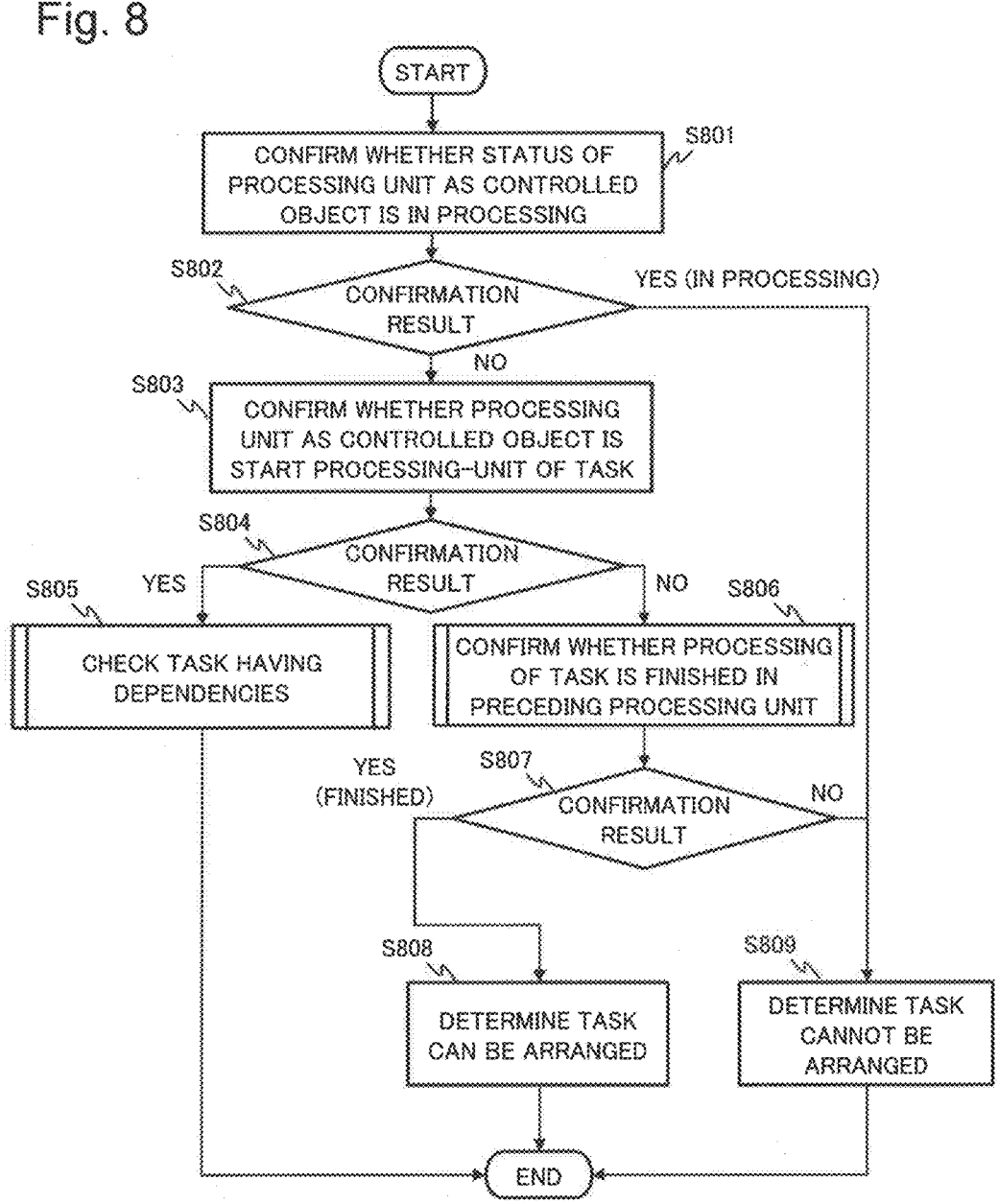
FIG. 8 is a flowchart (2/3) exemplifying the operation of the task control unit according to the first example embodiment of the present invention.
Figure 9:
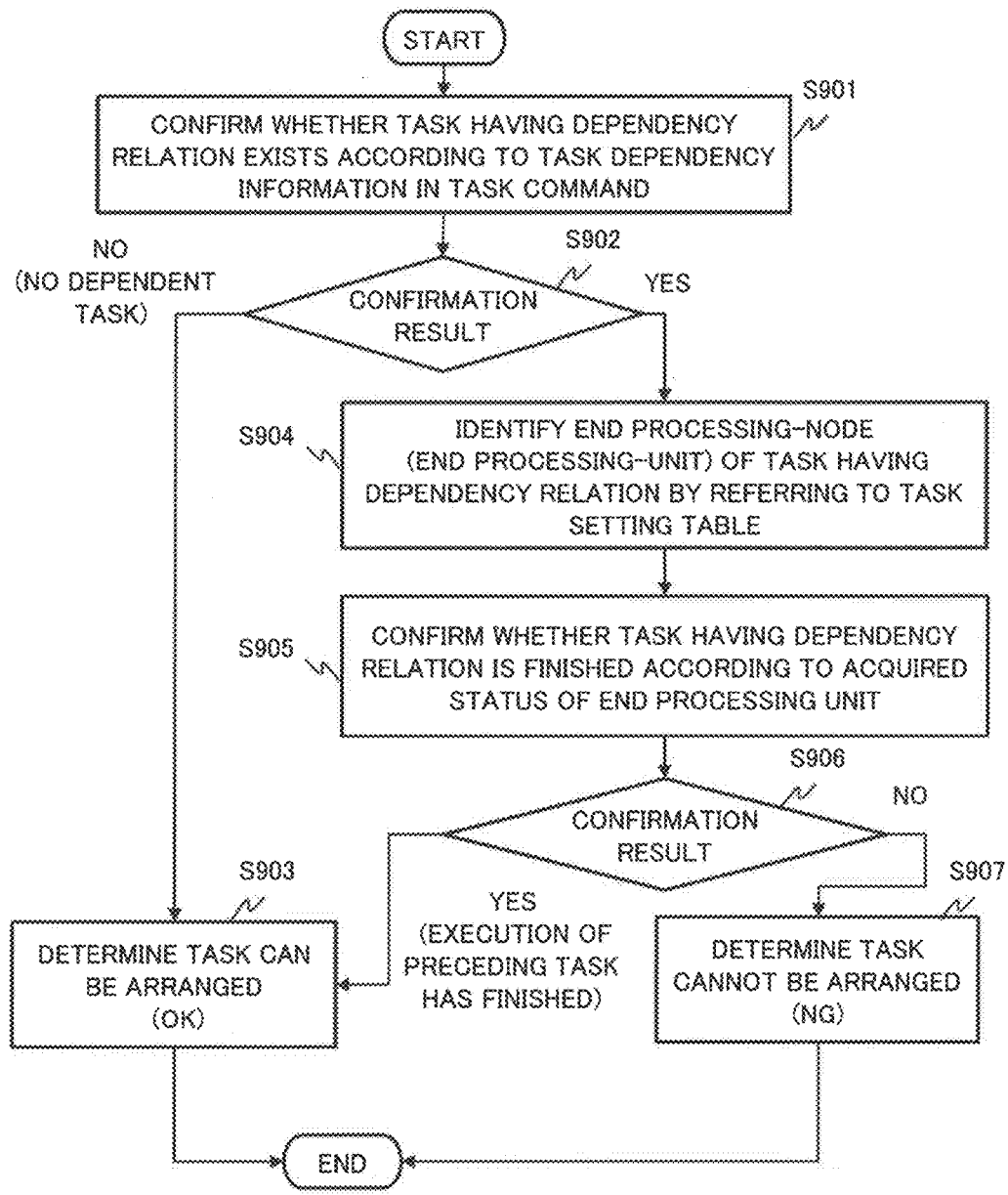
FIG. 9 is a flowchart (3/3) exemplifying the operation of the task control unit according to the first example embodiment of the present invention.

Hereinafter, with reference to a flowchart exemplified in FIG. 8, the processing in step S705 will be described. First, each of the task control units (112 to 114) confirms whether status information of one of the processing units (104 to 106) that is controlled object of the task control unit is "IN PROCESSING (1)" (step S801). In this specific example, from a result of the processing in the step S704, the status information of the respective processing units (104 to 106) indicates "WAITING (0)", and a confirmation result in step S802 indicates "NO". When the confirmation in step S801 results in "YES" in step S802, the processing unit as a controlled object is in the process of execution of operational processing in another task. Therefore, each of the task control units (112 to 114) determines that the task cannot be submitted (arrange) to one the processing units (104 to 106) that is subject to control by the task control unit (step S809).

When the confirmation result in step S802 is NO, each of the task control units (112 to 114) confirms whether one of the processing units (104 to 106) that is controlled object of the task control unit corresponds to the start processing-unit of the task specified by the task command (step S803). In the case of this specific example, each of the task control units (112 to 114) determines whether one of the processing units (104 to 106) that is controlled object of the task control unit corresponds to the start processing-unit of the "task A".

In the task setting tables (112*b* to 114*b*), the start processing-node number of the "task A" is set as "#0". This setting indicates that the start processing-unit is the processing unit 104. Therefore, as a result of the confirmation in step S802, the task control unit 112 determines that the processing unit 104, which is controlled object of the task control unit 112, corresponds to the start processing-unit of the "task A" (YES in step S804).

In this case, as a result of the confirmation in step S803, each of the other task control units 113 and 114 determines that one of the processing units (the processing units 105 and 106) that is controlled object of the task control unit does not correspond to the start processing-unit of the "task A" (NO in step S804).

In this case, the task control units 113 and 114 confirm whether processing in the "task A" has been finished in the processing units preceding the respective processing units (the processing units 105 and 106) (step S806).

More specifically, the task control unit 113, for example, refers to the task setting table 113*b* to identify a processing unit (the processing unit 104) preceding the processing unit 105, which is controlled object of the task control unit 113. The task control unit 113 may refer to the processing-node number ("#1") of the processing unit 105, and identify the processing unit 104 that corresponds to the processing-node number ("#0"), which precedes the processing-node number of the processing unit 105 by one.

The task control unit 113 refers to the status information of the processing unit 104 to confirm whether operational processing in the "task A" has been finished. In this case, since the operational processing in the "task A" in the processing unit 104 has not been finished, the task control unit 113 determines as "NO" in step S807.

Similarly, since the operational processing in the "task A" has not been finished in a processing unit (the processing unit 105) preceding the processing unit 106, the task control unit 114 determines as "NO" in step S807.

In consequence, the task control units 113 and 114 determine that the "task A" cannot be submitted to the processing units (the processing units 105 and 106), which are controlled objects of the task control units 113 and 114 (step S809).

Returning to FIG. 7, as a result of the step S809, the task control units 113 and 114 suppress execution of processing in the "task A" in the processing units 105 and 106 (step S710).

Returning to FIG. 8, next, the task control unit 112 checks another task having a dependency with a task (the "task A" in this case) specified by a task command (step S805). Hereinafter, with reference to FIG. 9, the processing in step S805 will be described.

First, the task control unit 112 refers to task dependency information (302 and 303 in FIG. 3) that is set in a task command (the "task command A" in this case) supplied from the processing control unit 101. The task control unit 112 confirms whether a task having a dependency with the "task A" exists (step S901).

In the case of this specific example, since no previous-task dependency information is set in the "task command A", the task control unit 112 determines that there is no previous-dependent task having a dependency with the "task A" ("NO" in step S902).

The task control unit 112 determines that a task (the "task A" in this case) can be submitted to the processing unit 104, which is controlled object of the task control unit 112 (step S903). That is, the task control unit 112 determines that the processing unit 104, being controlled by the task control unit 112, is able to execute the "task A". An operation in the case of being determined "YES" in step S902 will be described later.

Returning to FIG. 7 again, on the basis of the determination result in step S903, the task control unit 112 determines that the "task A" can be submitted to the processing unit 104, which is controlled object of the task control unit 112 (YES in step S706) in step S705.

Next, the task control unit 112 outputs a task execution control signal (task command) and data required for execution of the task, to the processing unit 104 (step S708). More specifically, the task control unit 112 controls the FIFO 107 to output the "task command A" stored in the FIFO 107 to the processing unit 104. The task control unit 112 may control the processing unit 104 to read data required for execution of the "task A" from the first memory unit 102, as needed.

As a result of the processing in step S708, operational processing in the "task A" is executed in the processing unit 104. Results of the operational processing in the "task A" in the processing unit 104 are stored in the data buffer 110 temporarily. When the data buffer 110 is almost filled with processing results in the processing unit 104 (when free space becomes less), the data buffer 110 outputs a specific signal ("AlmostFull" signal) to the processing unit 104. In this case, the operational processing in the processing unit 104 is stalled. A size of free space at which the data buffer 110 outputs an "AlmostFull" signal may be set in an appropriate manner.

After step S708, the task control unit 112 transitions to processing of control of a next task (step S709). Specifically, the task control unit 112, for example, confirms the status information of the processing unit 104 and, in this case, stands by for the completion of the operational processing in the "task A". The task control unit 112 refers to the task setting table 112b and an supplied task command, and starts to control the next task (the "task B" in this case) from step S701.

When the processing in the "task A" is finished in the processing unit 104, the status information of the processing unit 104 is changed to indicate "PROCESSING FINISHED (2)".

The task control unit 113, which suppressed submission of the "task A" to the processing unit 105, which is controlled object of the task control unit 113, in the step S710, acquires the status information of the processing unit 104 again in step S704. In this case, the status information indicates "PROCESSING FINISHED (2)".

Next, the task control unit 113 executes the processing in step S705 (steps S801 to S806). As a result of the processing, since the operational processing in the "task A" has been finished in the preceding processing unit 104, the task control unit 113 determines that the "task A" can be submitted to the processing unit 105 (step S808). That is, in this case, a determination result in step S706 is "YES".

On this occasion, the task control unit 114 executes processing in steps S704 to S706 again. In this case, in the processing unit 105 preceding the processing unit 106, the operational processing in the "task A" has not been finished yet. Therefore, the task control unit 114 determines that the "task A" cannot be submitted to the processing unit 106.

Next, the task control unit 113 outputs a task execution control signal (task command) and data required for execution of the task to the processing unit 105, which is controlled object of the task control unit 113 (step S708). More specifically, the task control unit 113 controls the FIFO 108 to output the "task command A" stored in the FIFO 108 to the processing unit 105. The task control unit 113 also controls the data buffer 110 to supply outputs (processing results) from the processing unit 104 to the processing unit 105. The task control unit 113 may control the processing unit 105 to read data required for execution of the "task A" from the first memory unit 102, as needed.

As a result of the processing in step S708, the operational processing in the "task A" is executed in the processing unit 105. Results of the operational processing in the "task A" in the processing unit 105 are stored in the data buffer 111 temporarily. When the data buffer 111 is almost filled with processing results in the processing unit 105 (when free space becomes less), the data buffer 111 outputs an "Almost-Full" signal to the processing unit 105. In this case, the operational processing in the processing unit 105 is stalled. A size of free space at which the data buffer 111 outputs an "AlmostFull" signal may be set appropriately.

After step S708, the task control unit 113 transitions to processing of control of a next task (step S709). More specifically, the task control unit 113, for example, confirms the status information of the processing unit 105 and, in this case, stands by for the completion of the operational processing in the "task A". The task control unit 113 refers to the task setting table 113b and an input task command to start control of the next task (the "task B" in this case) in step S701 and onward.

When the operational processing in the "task A" is finished in the processing unit 104, the task control unit 112 starts processing from step S701. In this case, the task control unit 112 refers to the task setting table 112b (step S701). The task control unit 112, based on contents of the task setting table 112b and a task command output from the processing control unit 101, confirms that the next task is the "task B".

Next, the task control unit 112 confirms whether the processing unit 104, subject to control by the task control unit 112, is included in the processing in the "task B" (step S702). With reference to the task setting table 112b, the start processing-node number of the "task B" is "#1". The processing-node number "#1" represents the processing unit 105. Therefore, the task control unit 112 determines that the processing unit 104, subject to control by the task control unit 112, is not included in the processing in the "task B" ("NO" in step S703). In this case, the task control unit 112 and the processing unit 104 stay in a stand-by state until a next task is output from the processing control unit 101.

When the processing in the "task A" is finished in the processing unit 105, the status information of the processing unit 105 is updated so as to indicate "PROCESSING FINISHED (2)".

The task control unit 114, which suppressed submission of the "task A" to the processing unit 106, which is controlled object of the task control unit 114, in the step S710, acquires the status information of the processing unit 105 again in step S704. In this case, the status information indicates "PROCESSING FINISHED (2)".

Next, the task control unit 114 executes the processing in step S705 (steps S801 to S807). As a result of the processing, since the operational processing in the "task A" has been finished in the preceding processing unit 105, the task control unit 114 determines that the "task A" can be submitted to the processing unit 106 (step S808).

Next, the task control unit 114 outputs a task execution control signal (task command) and data required for execution of the task to the processing unit 106, which is controlled object of the task control unit 114 (step S708). More specifically, the task control unit 114 controls the FIFO 109 to output the "task command A" stored in the FIFO 109 to the processing unit 106. The task control unit 114 also controls the data buffer 111 to supply outputs (processing results) from the processing unit 105 to the processing unit 106. The task control unit 114 may control the processing unit 106 to read data required for execution of the "task A" from the first memory unit 102, as needed.

As a result of the processing in step S708, the operational processing in the "task A" is executed in the processing unit 106. Results of the operational processing in the "task A" in the processing unit 106 may be output to the second memory unit 103.

After step S708, the task control unit 114 transitions to processing of control of a next task (step S709). More specifically, the task control unit 114, for example, confirms the status information of the processing unit 106 and, in this case, stands by for the completion of the operational processing in the "task A". The task control unit 114 refers to the task setting table 114b and an input task command, and starts to control the next task (the "task B" in this case) from step S701.

When the operational processing in the "task A" is finished in the processing unit 105, the task control unit 113 starts processing from step S701. In this case, the task control unit 113 refers to the task setting table 113b (step S701). The task control unit 113, based on contents of the task setting table 113b and a task command output from the processing control unit 101, confirms that the next task is the "task B".

Next, the task control unit 113 confirms whether the processing unit 105, which is controlled object of the task control unit 113, is included in the processing in the "task B" (step S702). With reference to the task setting table 113b, the start processing-node number of the "task B" is "#1". The processing-node number "#1" represents the processing unit 105. Therefore, the task control unit 113 determines that the processing unit 105, controlled by the task control unit 113, is included in the processing in the "task B" ("YES" in step S703).

Next, the task control unit 113 executes processing in steps S704 and S705. On this occasion, the task control unit 113 confirms that the processing unit 105, subject to control by the task control unit 113, is the start processing-unit of the "task B", in step S803 ("YES" in step S804).

Next, the task control unit 113 executes processing in step S805. On this occasion, the task control unit 113 refers to the task dependency information (302 and 303 in FIG. 3) of the "task command B" to confirm whether a task having a dependency with "task command B" exists (step S901).

Hereinafter, a case that no task dependency information has been set, as in the "task command A" (401) and "task command B" (402) illustrated in FIG. 4, will be described. In this case, the "task B" and "task A" can be executed independently. In this case, the task control unit 113 determines that there is no task having a dependency with another task ("NO" in step S902).

The task control unit 113 determines that a task (the "task B" in this case) can be submitted to the processing unit 105, which is controlled object of the task control unit 113 (that is, the processing unit 105 is able to execute the "task B") (step S903).

In this case, the task control unit 113 outputs a task execution control signal (task command) and data required for execution of the task to the processing unit 105, which is controlled object of the task control unit 113 (step S708). More specifically, the task control unit 113 controls the FIFO 108 to output the "task command B" stored in the FIFO 108 to the processing unit 105. The task control unit 113 may control the processing unit 105 to read data required for execution of the "task B" from the first memory unit 102, as needed.

As a result of the processing in step S708, operational processing in the "task B" is executed in the processing unit 105. Processing thereafter is the same as the operational processing in the "task A" in the processing unit 105.

Hereinafter, a case that task dependency information is assumed to be set as in the "task command A" (501) and "task command B" (502) illustrated in FIG. 5 will be described. In this case, since there is a dependency between the "task B" and "task A", the "task B" is required to be executed after processing in the "task A" is finished. In this case, the confirmation by the task control unit 113 in step S901 results in "YES" in step S902.

The task control unit 113 refers to the task setting table 113b to identify the end processing-unit of a task (the "task A") having a dependency with the "task B" (step S904). The end processing-unit of the "task A" is the processing unit 106 (the end processing-node number is "#2").

Next, the task control unit 113 confirms the status information of the processing unit (the processing unit 106) identified in step S904. The task control unit 113, based on the status information of the processing unit 106, confirms whether operational processing in a task (the "task A") having a dependency with the "task B" has been finished in the processing unit 106 (step S905).

At this point, as described above, while the operational processing in the "task A" in the processing unit 105 has been finished, there may be a case where the processing in the "task A" in the processing unit 106 has not been finished. When the processing in the "task A" in the processing unit 106 has not been finished, a confirmation result in step S906 is "NO". In this case, the task control unit 113 determines that the "task B" cannot be submitted to the processing unit 105 (step S907). In this case, the task control unit 113 suppresses execution of the "task B" (step S710). More specifically, the task control unit 113 may suppress, for example, output of the "task command B" from the FIFO 108 and the like.

Next, when the processing in the "task A" in the processing unit 106 is finished, the status information of the processing unit 106 is changed to "PROCESSING FINISHED (2)".

Once again, the case in which task dependency information is set as in the "task command A" (501) and "task command B" (502) illustrated in FIG. 5 will be described.

The task control unit 113, which suppressed submission of the "task B" to the processing unit 106, which is controlled object of the task control unit 113, in the step S710, acquires the status information of the processing unit 106 in step S704. In this case, the status information indicates "PROCESSING FINISHED (2)".

Next, the task control unit 113 executes the processing in step S705 (steps S801 to S805). As a result of the processing, the task control unit 113 determines that the operational processing in the "task A", which has a dependency with the "task B", has been finished (steps S901 to S905). Therefore, the task control unit 113 determines that the "task B" can be submitted to the processing unit 105 (YES in step S906). That is, in this case, a determination result in step S706 is "YES".

Next, the task control unit 113 outputs a task execution control signal (task command) and data required for execution of the task to the processing unit 105, which is controlled object of the task control unit 113 (step S708). More specifically, the task control unit 113 controls the FIFO 108 to output the "task command B" stored in the FIFO 108 to the processing unit 105. The task control unit 113 may also control the data buffer 110 to output contents in the data buffer 110 to the processing unit 105. The task control unit 113 may control the processing unit 105 to read data required for execution of the "task B" from the first memory unit 102, as needed.

As a result of the processing in step S708, operational processing in the "task B" is executed in the processing unit 105. Results of the operational processing in the "task B" in the processing unit 105 are stored in the data buffer 111 temporarily. Processing thereafter is the same as the processing in the "task A" in the processing unit 105.

When the operational processing in the "task A" in the processing unit 106 is finished, the task control unit 114 starts processing from step S701. In this case, the task control unit 114 refers to the task setting table 114b (step S701). The task control unit 114, based on contents of the task setting table 114b and a task command output from the processing control unit 101, confirms that a next task is the "task B".

Next, the task control unit 114 confirms whether the processing unit 106, subject to control by the task control unit 114, is included in the processing in the "task B" (step S702). With reference to the task setting table 112b, the end processing-node number of the "task B" is "#2". Therefore, the task control unit 114 determines that the processing unit 106, which is controlled object of the task control unit 114, is included in the processing in the "task B" ("YES" in step S703).

Next, the task control unit 114 executes processing in steps S704 and S705. On this occasion, the task control unit 114 confirms that the processing unit 106, controlled by the task control unit 114, is not the start processing-unit of the "task B", in step S803 ("NO" in step S804).

In this case, the task control unit 114 confirms whether processing in the "task B" has been finished in the processing unit 105 preceding the processing unit 106 (step S806). In this case, since the operational processing in the "task B" in the processing unit 105 has not been finished, the task control unit 114 determines as "NO" in step S807. Due to this confirmation, the task control unit 114 determines that the "task B" cannot be submitted to the processing unit 106, which is controlled object of the task control unit 114 (step S809).

Returning to FIG. 7, as a result of the step S809, the processing in the "task B" in the processing unit 106 is suppressed (step S710).

Next, when the processing in the "task B" in the processing unit 105 is finished, the status information of the processing unit 105 is changed to indicate "PROCESSING FINISHED (2)".

The task control unit 114, which suppressed submission of the "task B" to the processing unit 106 controlled by the task control unit 114, in the step S710, acquires the status information of the processing unit 105 again in step S704. In this case, the status information indicates "PROCESSING FINISHED (2)".

Next, the task control unit 114 executes processing in step S705 (steps S801 to S807). As a result of the processing, since the operational processing in the "task B" has been finished in the preceding processing unit 105, the task control unit 114 determines that the "task B" can be submitted to the processing unit 106 (step S808).

Next, the task control unit 114 outputs a task execution control signal (task command) and data required for execution of the task to the processing unit 106, which is controlled object of the task control unit 114 (step S708). More specifically, the task control unit 114 controls the FIFO 109 to output the "task command B" stored in the FIFO 109 to the processing unit 106. The task control unit 114 also controls the data buffer 111 to supply outputs (processing results) from the processing unit 105 to the processing unit 106. The task control unit 114 may control the processing unit 106 to read data required for execution of the "task B" from the first memory unit 102, as needed.

As a result of the processing in step S708, operational processing in the "task B" is executed in the processing unit 106. Results of the operational processing in the "task B" in the processing unit 106 may be output to the second memory unit 103.

When the processing in the "task B" is finished in the processing unit 106, the status of the processing unit 106 is changed to indicate "PROCESSING FINISHED (2)" and the operational processing in the "task A" and "task B", which have been submitted from the processing control unit 101, is finished.

As described above, the present example embodiment enables to control execution of a task so that the respective processing units (104 to 106) can operate efficiently in the processing device 100. The processing device 100 is configured to include a plurality of the processing units (104 to 106) are connected in a pipeline form through the data buffers (110 to 111). That is, when executing a task including operational processing being executed in a pipeline by use of the plurality of processing units (104 to 106), the processing device 100 in the present example embodiment is able to reduce an idle state and latency in the respective processing units. Because of this advantage, the processing device 100 in the present example embodiment further is able to reduce overheads over the pipeline.

Specifically, the processing device 100 in the present example embodiment is capable of, without waiting for the completion of all the operational processing in a specific task, executing operational processing in another task that has no dependency with the specific task in some processing units.

Figure 18:
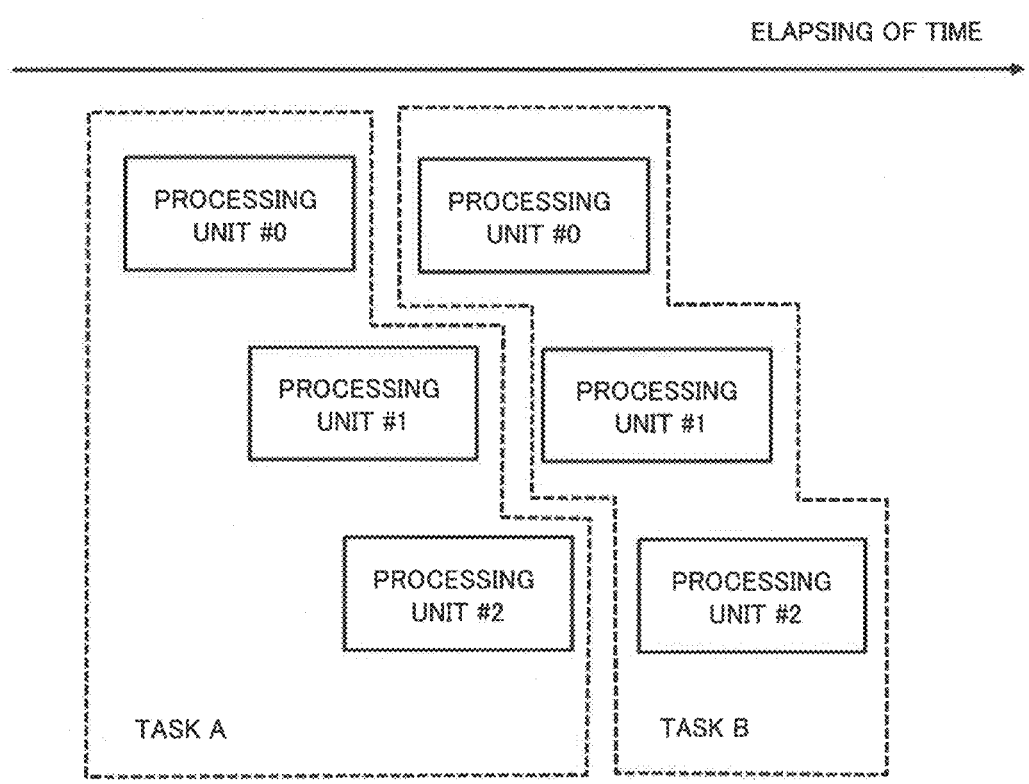
FIG. 18 is a diagram schematically illustrating an execution process of a task in the processing device according to the first example embodiment of the present invention.

In the specific example described above, when, for example, there is no dependency between the "task A" and "task B", the processing device 100 is capable of executing the operational processing in the "task B" in some processing units before the processing in the "task A" is finished. Specifically, the processing device 100 is capable of executing the operational processing in the "task B" in some processing units (for example, the processing unit 105) before the operational processing in the "task A" in the processing unit 106 is finished. In this case, the processing device 100 is capable of starting the operational processing in the "task B" before the operational processing in the "task A" is finished, as exemplified in FIG. 18. Because of this feature, the processing device 100 in the present example embodiment is able to reduce the entire processing time and to shorten the period for which the respective processing units stay idle state.

The respective task control units (112 to 114) in the present example embodiment control whether or not operational processing in a task is executed in the respective processing units (104 to 106). That is, since the respective task control units execute task control in detail, a load on an upper-level control system (for example, the processing control unit 101) related to task control does not increase.

Consequently, the processing device 100 in the present example embodiment is able to improve efficiency in operational processing in a task and is able to speed up the operational processing. That is because, based on the execution states (statuses) of the respective processing units (104 to 106) and the setting information of respective tasks (the respective task setting tables (112b to 114b), task commands, and so on), execution of the tasks is controlled with respect to each processing unit.

Second Example Embodiment

Next, a second example embodiment of the present invention will be described. In the following description, characteristic components according to the present example embodiment will mainly be described. Overlapping descriptions on the same components as those in the first example embodiment will be omitted.

The present example embodiment is the same as the first example embodiment except the types of information that is set to respective task setting tables (112b to 114b). Therefore, it may be assumed that a configuration of a processing device 100 in the present example embodiment is the same as that of the processing device 100 in the first example embodiment.

In the first example embodiment, with respect to each task to be executed, a start processing-node number 201 and an end processing-node number 202 for the task are set to the task setting tables (112b to 114b), as exemplified in FIG. 2.

On the other hand, in the present example embodiment, with respect to each task to be executed, a start processing-node number 201 for the task and a processing-node count 1002 that represents the number of processing units that the task uses, are set to the task setting tables (112b to 114b), as exemplified in FIG. 10.

For a specific task, respective task control units identify the end processing-unit of the task based on a start processing-node number 201 and processing-node count 1002 as described above. In this case, the respective task control units may calculate the end processing-node number in the first example embodiment based on the start processing-node number 201 and processing-node count 1002.

The respective task control units in the present example embodiment identify the end processing-unit of the task based on the start processing-node number 201 and processing-node count 1002, in the step S904. The other operations are the same as those in the first example embodiment.

Consequently, the processing device 100 in the present example embodiment provides the same advantageous effects as the processing device 100 in the first example embodiment. The processing device 100 in the present example embodiment does not require an end processing-unit to be specified directly and is able to control execution of operational processing in a task in the respective processing units by specifying the number of processing units to be used.

Third Example Embodiment

Next, a third example embodiment of the present invention will be described. In the following description, characteristic components according to the present example embodiment will mainly be described. Overlapping descriptions of the same components as those in the above-described respective example embodiments will be omitted.

Figure 11:
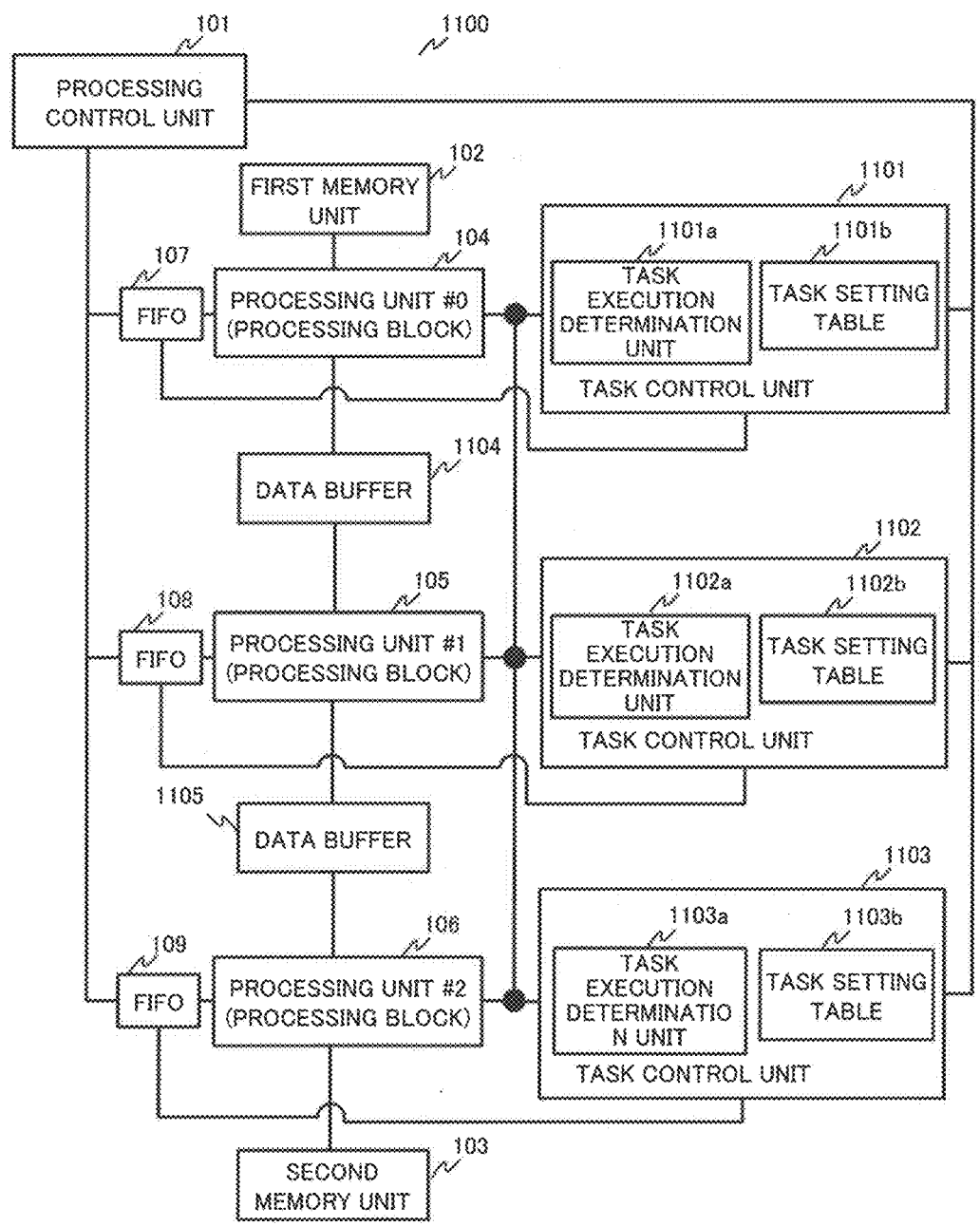
FIG. 11 is a diagram exemplifying a functional configuration of a processing device according to a third example embodiment of the present invention.

Hereinafter, the present example embodiment will be described with reference to FIG. 11.

The present example embodiment is a variation of the first example embodiment. A difference between the processing device 100 in the first example embodiment and a processing device 1100 in the present example embodiment is that data buffers (1104 and 1105 in FIG. 11) and task control units (1101, 1102, and 1103 in FIG. 11) are not connected to each other.

In the first example embodiment, the task control units (for example, the task control unit 113) controls the data buffers (for example, the data buffer 110) to output data required for execution of a task in the respective processing units (for example, the processing unit 105). Alternatively, the task control units (for example, the task control unit 113) notifies the respective processing units of the areas (addresses or the like) of the data buffers in which data required for execution of a task in the respective processing units are stored, and the respective processing units acquire data from the areas.

On the other hand, the processing device 1100 in the present example embodiment differs from the processing device 100 in the first example embodiment in that the task control units (1101 to 1103) do not control the data buffers (1104 and 1105) directly.

In the present example embodiment, a special command is output to the data buffers from preceding processing units (104 and 105) connected to the respective data buffers (1104 and 1105).

Specifically, when having finished processing in a task, the processing unit 104 preceding the data buffer 1104 outputs (submits) a special command "Sync" to the data buffer 1104. Similarly, when having finished processing in a task, the processing unit 105 preceding the data buffer 1105 outputs (submits) a special command "Sync" to the data buffer 1105.

Figure 12:
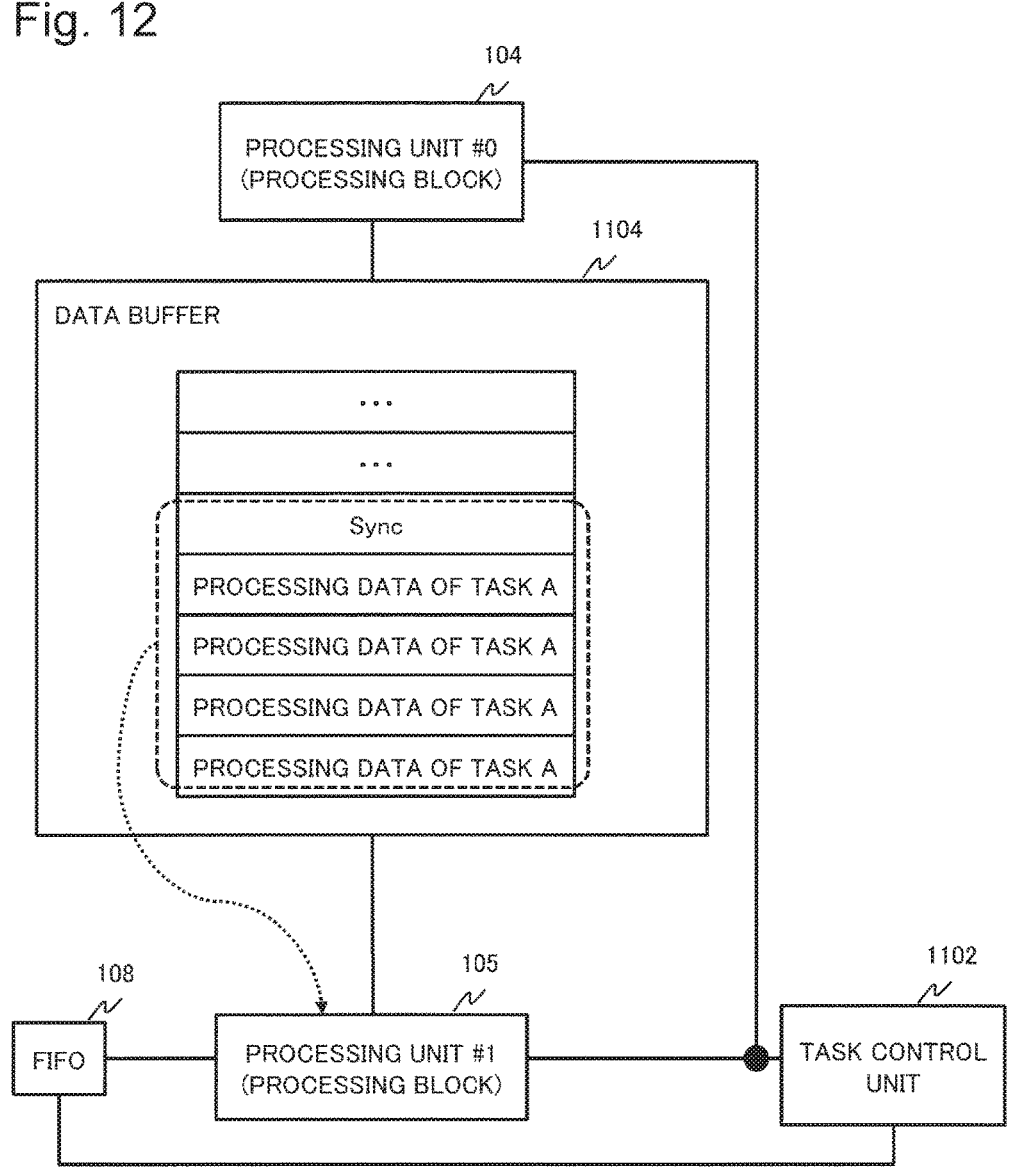
FIG. 12 is a diagram illustrating a specific example of data stored in a data buffer 1104 according to the third example embodiment of the present invention.

The respective data buffers (1104 and 1105) prohibits read access to data submitted after a submission of the special command ("Sync"), until all the data having been submitted before the submission of the special command are read out. More specifically, in the present example embodiment, the processing unit 105 is able to acquire data having been submitted before the submission of the special command ("Sync") from the preceding data buffer 1104, as exemplified in FIG. 12. Although not exemplified in FIG. 12, this operation also applies to the processing unit 106.

The processing device 1100 in the present example embodiment, which is configured as described above, is capable of executing the same operational processing as the first example embodiment. That is because the respective data buffers (1104 and 1105) is able to control access to data exclusively for each task, by prohibiting access to data submitted after a submission of a special command.

The special command is not limited to "Sync". The processing device 1100 in the present example embodiment may employ any identification code other than "Sync" as a command.

Fourth Example Embodiment

Next, a fourth example embodiment of the present invention will be described. In the following description, characteristic components according to the present example embodiment will mainly be described. Overlapping descriptions of the same components as those in the respective example embodiments will be omitted.

Figure 13:
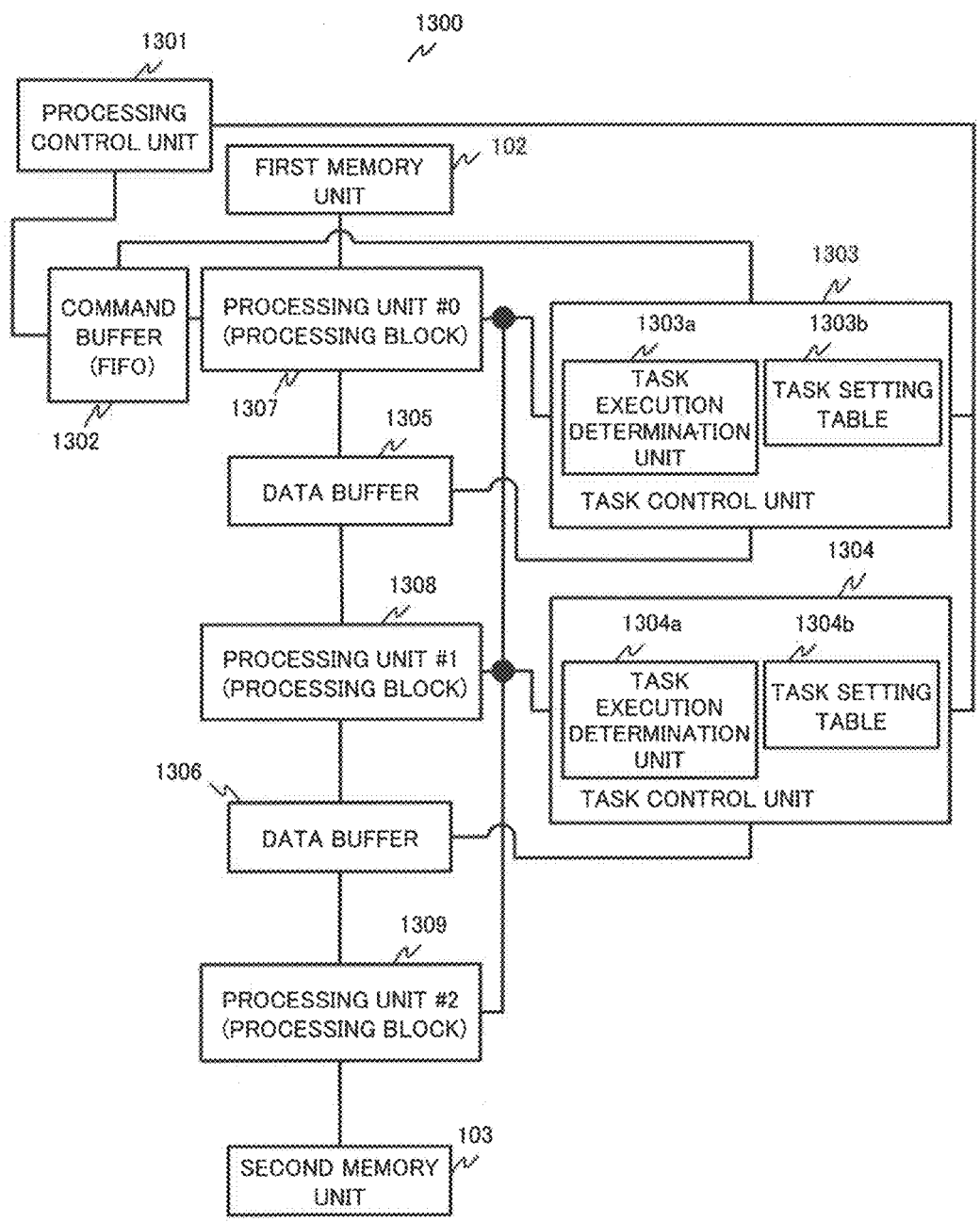
FIG. 13 is a diagram exemplifying a functional configuration of a processing device according to a fourth example embodiment of the present invention.

Hereinafter, with reference to FIG. 13, a processing device 1300 in the present example embodiment will be described.

A processing control unit 1301 is connected to a command buffer 1302. In the following description, the command buffer 1302 may be referred to as "FIFO 1302". The FIFO 1302 is connected to a processing unit 1307. A control signal (task command) is not input from the processing control unit 1301 to other processing units (1308 and 1309) directly.

When finishing operational processing in a task, each of the processing units (the processing units 1307, 1308, and 1309) passes (transfers) a task command regarding to the task, to a succeeding processing unit. That is, in the present example embodiment, a task command is transferred from a preceding processing unit to a succeeding processing unit through a data buffer.

Specifically, a task command is passed (transferred) from the preceding processing unit 1307 to the processing unit 1308 through a data buffer 1305. The task command is handed from the preceding processing unit 1308 to the processing unit 1309 through a data buffer 1306. The other part of the configurations of the processing units (1307 to 1309) in the present example embodiment may be the same as those in the respective example embodiments.

A task control unit 1303 in the present example embodiment confirms a status of the processing unit 1307, which is controlled object of the task control unit 1303, to determine whether a task can be submitted to the succeeding processing unit 1308. Similarly, a task control unit 1304 in the present example embodiment confirms a status of the processing unit 1308, which is controlled object of the task control unit 1304, to determine whether a task can be submitted to the succeeding processing unit 1309.

In the present example embodiment, start processing-units are fixed to the processing unit 1307. Therefore, in task setting tables (1303b and 1304b) included in the respective task control units (1303 and 1304), only end processing-node numbers or processing-node counts may be set.

The data buffers (1305 and 1306) in the present example embodiment may be similar to the data buffers in the respective example embodiments.

Hereinafter, an operation of the processing device 1300, configured as described above, in the present example embodiment will be described.

First, it is assumed that, in the first memory unit 102, data to be used for operational processing in the processing units (1307 to 1309) are stored.

For the convenience of explanation, it is assumed that the number of tasks to be executed is two ("task A" and "task B"). Between the two tasks, the first task (the "task A") is executed in the processing units 1307, 1308, and 1309. The second task (the "task B") is also executed in the processing units 1307, 1308, and 1309.

With regard to the "task A" and "task B", any operational processing may be executed. Commands regarding the "task A" and "task B" are referred to as "task command A" and "task command B", respectively. Each of the "task command A" and "task command B" includes, as with the first example embodiment, a task identifier 301, a previous-task dependency information 302, and a next-task dependency information 303.

In the task setting tables (1303b and 1304b) in the respective task control units (1303 and 1304), "#2" is stored as end processing-node numbers (signs 202 exemplified in FIG. 2) of the "task A" and "task B". The end processing-node number "#2" represents the processing unit 1309.

As with the above-described respective example embodiments, any one of "WAITING" ("0"), "IN PROCESSING" ("1."), and "PROCESSING FINISHED" ("2") is input to the respective task control units (1303 and 1304) as statuses of the respective processing units (1307 to 1309).

Hereinafter, specific processing in the "task A" and "task B" in the respective processing units (1307 to 1309) will be described with reference to flowcharts exemplified in FIGS. 14 and 15.

Figure 7:
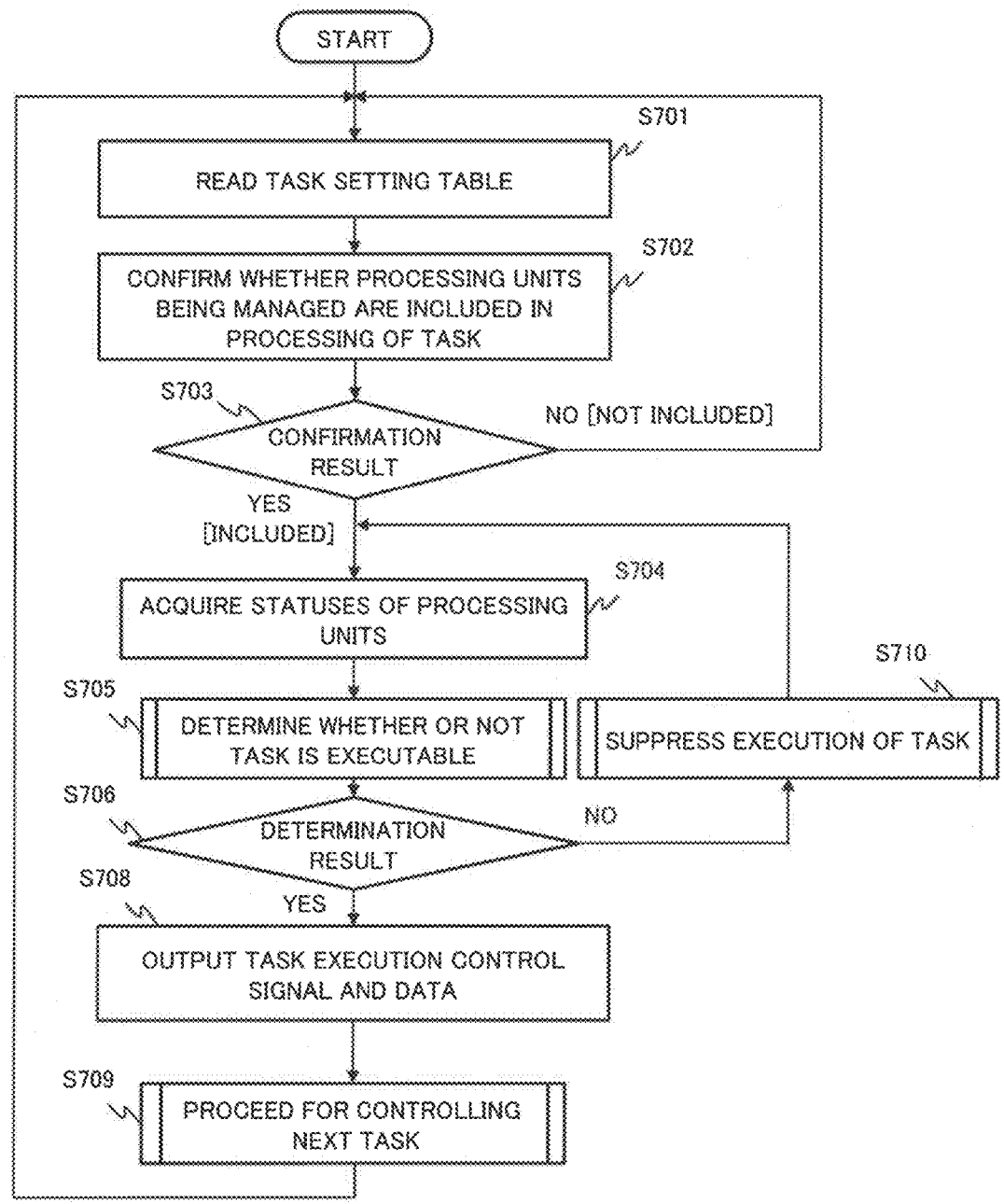
FIG. 7 is a flowchart (1/3) exemplifying an operation of a task control unit according to the first example embodiment of the present invention.
Figure 14:
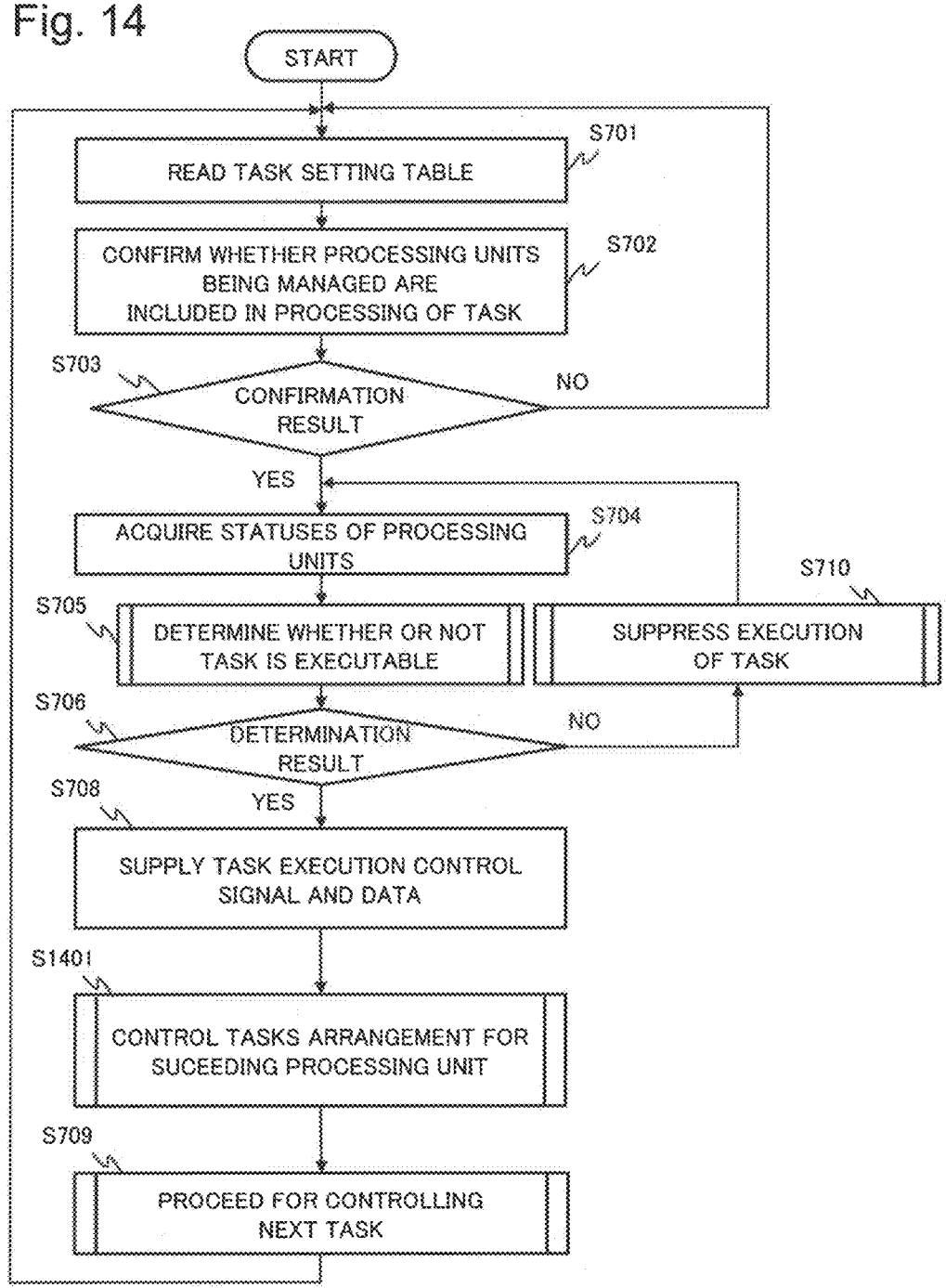
FIG. 14 is a flowchart exemplifying an operation of a task control unit according to the fourth example embodiment of the present invention.
Figure 15:
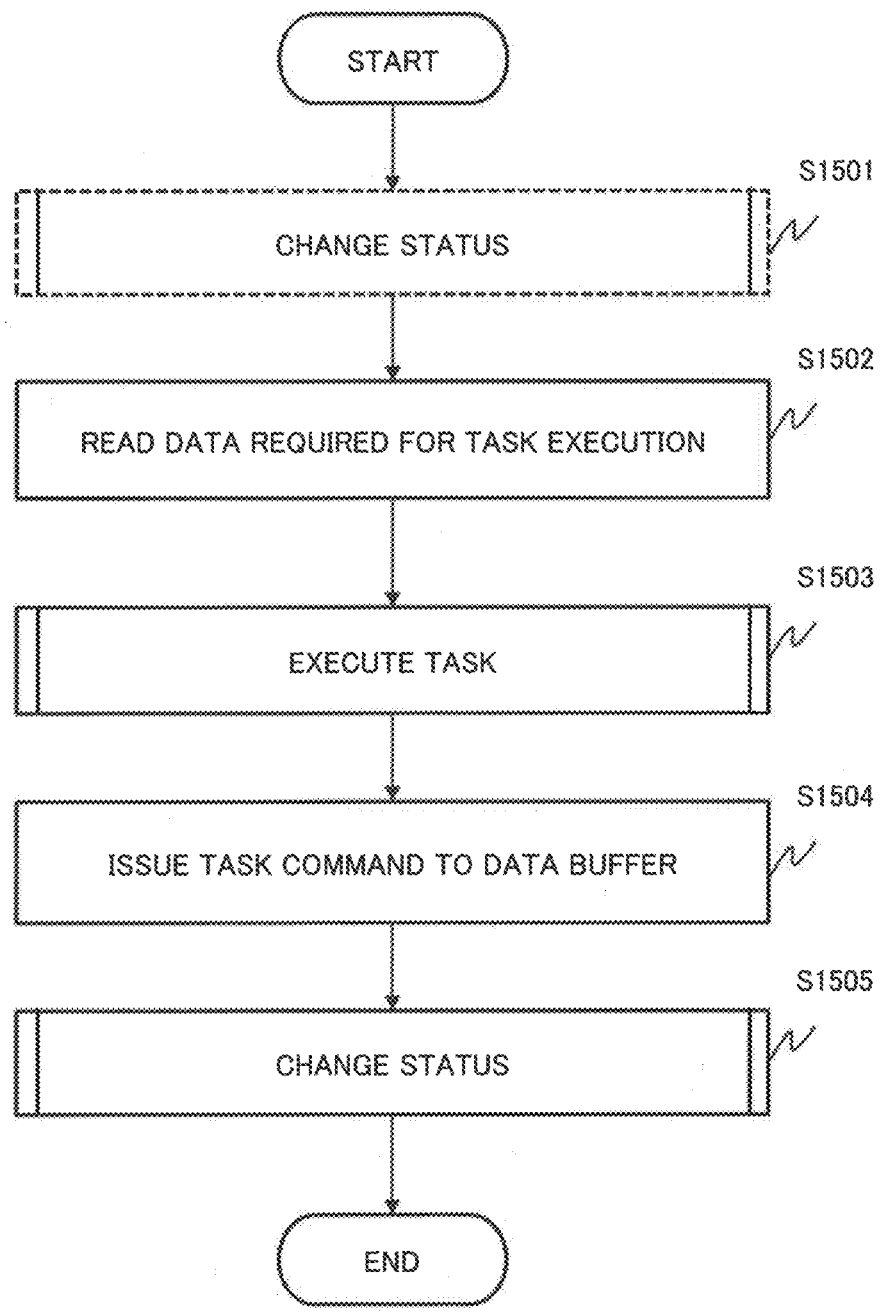
FIG. 15 is a flowchart exemplifying an operation of a processing unit according to the fourth example embodiment of the present invention.

In the flowchart exemplified in FIG. 14, processing that is typical of the task control units (1303 and 1304) in the present example embodiment is added to the flowchart exemplified in FIG. 7. The same processing as in the processing device 100 in the first example embodiment will be described with reference to the flowcharts (FIGS. 7 to 9) that were described in the first example embodiment.

First, the processing control unit 1301 generates commands ("task command A" and "task command B") that instruct execution of the "task A" and "task B". The generated task commands are supplied to the FIFO 1302 and the task control units 1303 and 1304.

When the "task command A" and "task command B" are supplied to the FIFO 1302, the FIFO 1302 accumulates the task commands.

When the "task command A" is supplied, the task control units (1303 and 1304) first determine whether the submitted task (the "task A") can be executed, as similar to the task control units (112, 113, and 114) in the first example embodiment.

When the "task command A" is submitted, the task control units (1303 and 1304) refer to the task setting tables (1303b and 1304b) (step S701). More specifically, the task control units (1303 and 1304) read an end processing-node number ("#2" in this case) from the task setting tables (1303b and 1304b). In the present example embodiment, as described above, the start processing-units for the "task A" and "task B" are the processing unit 1307 (the start processing-node number is "#0").

The task control units (1303 and 1304) confirm whether the processing units, which are subject to control by the task control units (1303 and 1304), are included in the processing of the tasks (the "task A" and "task B") (step S702). The task control units (1303 and 1304) may, by referring to the task setting tables (1303b and 1304b), confirm processing-node numbers representing processing units that execute the processing in the "task A" and "task B".

In this case, since both the "task A" and "task B" are processed using all the processing units (1307 to 1309), a confirmation result in step S703 is "YES".

Next, the task control units (1303 and 1304) acquire the statuses (status signals) of the respective processing units (1307 to 1309). The task control units (1303 and 1304) confirm states of operational processing in the respective processing units, based on the acquired statuses (1307 to 1309) (step S704). The task control units (1303 and 1304) confirm status signals from the processing units corresponding to the processing-node numbers confirmed as described above.

Next, the task control units (1303 and 1304) determine whether operational processing in a task (the "task A") can be executed in the processing units, which are controlled object of the task control units, on the basis of the acquired statuses (1303 and 1304) (step S705).

At a timing when the "task command A" is submitted, the statuses of the processing units (1307 to 1309) are "WAITING" ("0"). Therefore, these processing units are able to execute the operational processing in the "task A".

Hereinafter, an operation of the task control unit 1303 in this case will be described.

Since the value of the start processing-node number is "#0", the task control unit 1303 determines that the operational processing in the "task A" can be executed in the processing unit 1307 (YES in step S706).

Next, the task control unit 1303 outputs a task execution control signal (task command) and data required for execution of the task to the processing unit 1307 (step S708). More specifically, the task control unit 1303 controls the FIFO 1302 to output the "task command A" stored by the FIFO 1302 to the processing unit 1307. The task control unit 1303 may control the processing unit 1307 to read data required for execution of the "task A" from the first memory unit 102, as needed. As a result of the processing in step S708, the operational processing in the "task A" is executed in the processing unit 1307.

Results of the operational processing in the "task A" in the processing unit 1307 are stored in the data buffer 1305. When the data buffer 1305 is almost filled with processing results in the processing unit 1307 (when free space becomes less), the data buffer 1305 outputs an "AlmostFull" signal to the processing unit 1307. In this case, the operational processing in the processing unit 1307 is stalled. A size of free space at which the data buffer 1305 outputs an "AlmostFull" signal may be set appropriately.

Hereinafter, the operational processing in the processing unit 1307 will be described with reference to FIG. 15.

First, when a task command (the "task command A") is input from the FIFO 1302 to the processing unit 1307, the processing unit 1307 changes the status of the processing unit 1307 to "IN PROCESSING" ("1") (step S1501). Such status change may be executed in step S1503, which will be described later.

Next, the processing unit 1307 reads data required for execution of a task (the "task A") specified by the task command (step S1502). In this case, the processing unit 1307 may read data required for execution of the "task A" from the first memory unit 102.

Next, the processing unit 1307 executes operational processing in the task specified by the task command (the "task command A") (step S1503).

When the operational processing in the task specified by the task command (the "task command A") is finished, the processing unit 1307 issues a task command to the data buffer 1305 (step S1504). In this case, the processing unit 1307 may output the "task command A" to the data buffer 1305.

When the operational processing in the task is finished, the processing unit 1307 changes the status thereof to "PROCESSING FINISHED" ("2") (step S1505). In this case, the processing unit 1307 may notify the task control units (1303 and 1304) of the status.

Next, the task control unit 1303 controls submission of the "task A" to the succeeding processing unit 1308 (step S1401).

More specifically, when the status of the processing unit 1307 turns to "PROCESSING FINISHED" ("2"), the task control unit 1303 determines that the "task A" can be submitted to the succeeding processing unit 1308.

In this case, the task control unit 1303 controls the data buffer 1305 to output the "task command A" to the processing unit 1308. The task control unit 1303 may control the processing unit 1308 to acquire the "task command A" and processing results in the processing unit 1307 from the data buffer 1305.

When the "task command A" is submitted from the data buffer 1305 to the processing unit 1308, the operational processing in the "task A" is executed in the processing unit 1308. Results of the operational processing in the processing unit 1308 are stored in the data buffer 1306. When the data buffer 1306 is almost filled with processing results in the processing unit 1308 (when free space becomes scarce), the data buffer 1306 outputs an "AlmostFull" signal to the processing unit 1308. In this case, the operational processing in the processing unit 1308 is stalled.

Next, the task control unit 1303 continues processing from step S709 to execute the processing in steps S701 to S705. The task control unit 1303 determines whether the "task B" can be executed (step S705).

When, for example, it is assumed that next-task dependency information (the "task B") for the "task A" is set in the "task command A" and previous-task dependency information (the "task A") for the "task B" is set in the "task command B", processing results in the "task A" is used in the "task B".

In this case, since a task with a dependency (the "task A", on which the "task B" is dependent) has not been finished yet, the task control unit 1303 determines that the "task B" cannot be submitted to the processing unit 1307 ("NO" in step S706). That is, in this case, execution of the operational processing in the "task B" in the processing unit 1307 is suppressed until the "task A" is finished (step S710).

When, for example, it is assumed that no next-task dependency information is set in the "task command A" and no previous-task dependency information is set in the "task command B", the "task A" and "task B" can be processed independently.

In this case, the task control unit 1303 determines that the "task B" can be submitted to the processing unit 1307, as described in the first example embodiment ("YES" in step S706). The task control unit 1303 continues processing from step S708, and the "task B" is submitted to the processing unit 1307.

The task control unit 1303 controls the FIFO 1302 to output the "task command B" stored in the FIFO 1302 to the processing unit 1307. The task control unit 1303 may control the processing unit 1307 to read data required for execution of the "task B" from the first memory unit 102, as needed. As a result of the processing in step S708, the operational processing in the "task B" is executed in the processing unit 1307. In this case, the processing unit 1307 executes the operational processing in the "task B" by executing the processing in steps S1501 to S1505.

Results of the operational processing in the processing unit 1307 are stored in the data buffer 1305. When the data buffer 1305 is almost filled with processing results in the processing unit 1307 (when free space becomes scarce), the data buffer 1305 outputs an "AlmostFull" signal to the processing unit 1307. In this case, the operational processing in the processing unit 1307 is stalled.

Once again, return to the description about operational processing in the "task A" in the processing unit 1308.

The processing unit 1308 first changes its status to "IN PROCESSING" ("1") (step S1501). Such status change may be executed in step S1503, which will be described later.

Next, the processing unit 1308 reads data required for execution of a task (the "task A") specified by a task command acquired from the data buffer 1305 (step S1502). In this case, the processing unit 1307 may read data required for execution of the "task A" from the first memory unit 102 or the data buffer 1305.

Next, the processing unit 1308 executes operational processing in the task specified by the task command (the "task command A") (step S1503).

When the operational processing in the task specified by the task command (the "task command A") is finished, the processing unit 1308 issues a task command to the data buffer 1306 (step S1504). In this case, the processing unit 1308 may output the "task command A" to the data buffer 1306.

When the operational processing in the task is finished, the processing unit 1308 changes the status thereof to "PROCESSING FINISHED" ("2") (step S1505). In this case, the processing unit 1308 may notify the task control units (1303 and 1304) of the status.

Next, the task control unit 1304 controls submission of the "task A" to the succeeding processing unit 1309 (step S1401).

More specifically, when the status of the processing unit 1308 turns to "PROCESSING FINISHED" ("2"), the task control unit 1304 determines that the "task A" can be submitted to the succeeding processing unit 1309.

The task control unit 1304 controls the data buffer 1306 to output the "task command A" to the processing unit 1309. In this case, the task control unit 1304 may control the processing unit 1309 to acquire the "task command A" and processing results in the processing unit 1308 from the data buffer 1306.

When the "task command A" is submitted from the data buffer 1306 to the processing unit 1309, the operational processing in the "task A" is executed in the processing unit 1309.

Once again, return to the description about the processing in the task control unit 1303 at this timing.

As described above, when there is no dependency between the "task A" and "task B", there is a possibility that processing in the "task B" in the processing unit 1307 has been finished at this timing. In this case, the processing unit 1307 outputs the "task command B" to the data buffer 1305. The processing unit 1307 changes its own status to "PROCESSING FINISHED" ("2").

In this case, the task control unit 1303 controls submission of the "task B" to the succeeding processing unit 1308, in step S1401 (step S1401).

More specifically, when the status of the processing unit 1307 turns to "PROCESSING FINISHED" ("2"), the task control unit 1303 determines that the "task B" can be submitted to the succeeding processing unit 1308.

The task control unit 1303 controls the data buffer 1305 to output the "task command B" to the processing unit 1308. In this case, the task control unit 1303 may control the processing unit 1308 to acquire the "task command B" and processing results in the processing unit 1307 from the data buffer 1305.

When the "task command B" is submitted from the data buffer 1305 to the processing unit 1308, the operational processing in the "task B" is executed in the processing unit 1308. Processing results in the processing unit 1308 are stored in the data buffer 1306. When the data buffer 1306 is almost filled with processing results in the processing unit 1308, the data buffer 1306 outputs an "AlmostFull" signal to the processing unit 1308. In this case, the processing unit 1308 is stalled.

Return to description about the processing in the "task A" in the processing unit 1309.

The processing unit 1309 executes the operational processing in the "task A" (steps S1501 to S1505). The processing unit 1309 changes its own status to "PROCESSING FINISHED" ("2").

When there is a dependency between the "task A" and "task B", the task control unit 1303 is suppressing execution of the "task B" in the processing unit 1307, in step S710.

When the status of the processing unit 1309 turns to "PROCESSING FINISHED" ("2"), the processing in the "task A", which has a dependency with the "task B", is finished. Therefore, in this case, the task control unit 1303 determines that the operational processing in the "task B" can be executed in the processing unit 1307 (YES in step S706). The task control unit 1303 continues processing from step S708, and the "task B" is submitted to the processing unit 1307.

In this case, the task control unit 1303 controls the FIFO 1302 to output the "task command B" stored in the FIFO 1302 to the processing unit 1307. The task control unit 1303 may control the processing unit 1307 to read data required for execution of the "task B" from the first memory unit 102, as needed. As a result of the processing in step S708, the operational processing in the "task B" is executed in the processing unit 1307. In this case, the processing unit 1307 executes the operational processing in the "task B" by executing processing in steps S1501 and S1505. Thereafter, in the same manner as in the description above, the operational processing in the "task B" is executed in the processing units 1308 and 1309.

On the other hand, when there is no dependency between the "task A" and "task B", there is a possibility that the processing of the "task B" in the processing unit 1308 has been finished at this timing. In this case, the processing unit 1308 outputs the "task command B" to the data buffer 1306. The processing unit 1308 changes its own status to "PROCESSING FINISHED" ("2").

In this case, the task control unit 1304 controls submission of the "task B" to the succeeding processing unit 1309, in step S1401 (step S1401). Thereafter, the operational processing in the "task B" is executed in the processing unit 1309.

The processing device 1300 in the present example embodiment, which is configured as described above, is capable of controlling the respective processing units (1307 to 1309) with a smaller number of task control units (1303 and 1304), although first processing units at which execution of tasks is started are fixed. The processing device 1300 in the present example embodiment also is able to reduce the number of command buffers (FIFOs) 1302. Therefore, the processing device 1300 in the present example embodiment is able to provide the same advantageous effects as the processing devices in the above-described respective example embodiments, with a simpler configuration.

Fifth Example Embodiment

Next, a fifth example embodiment of the present invention will be described with reference to FIGS. 16 and 17.

Figure 16:
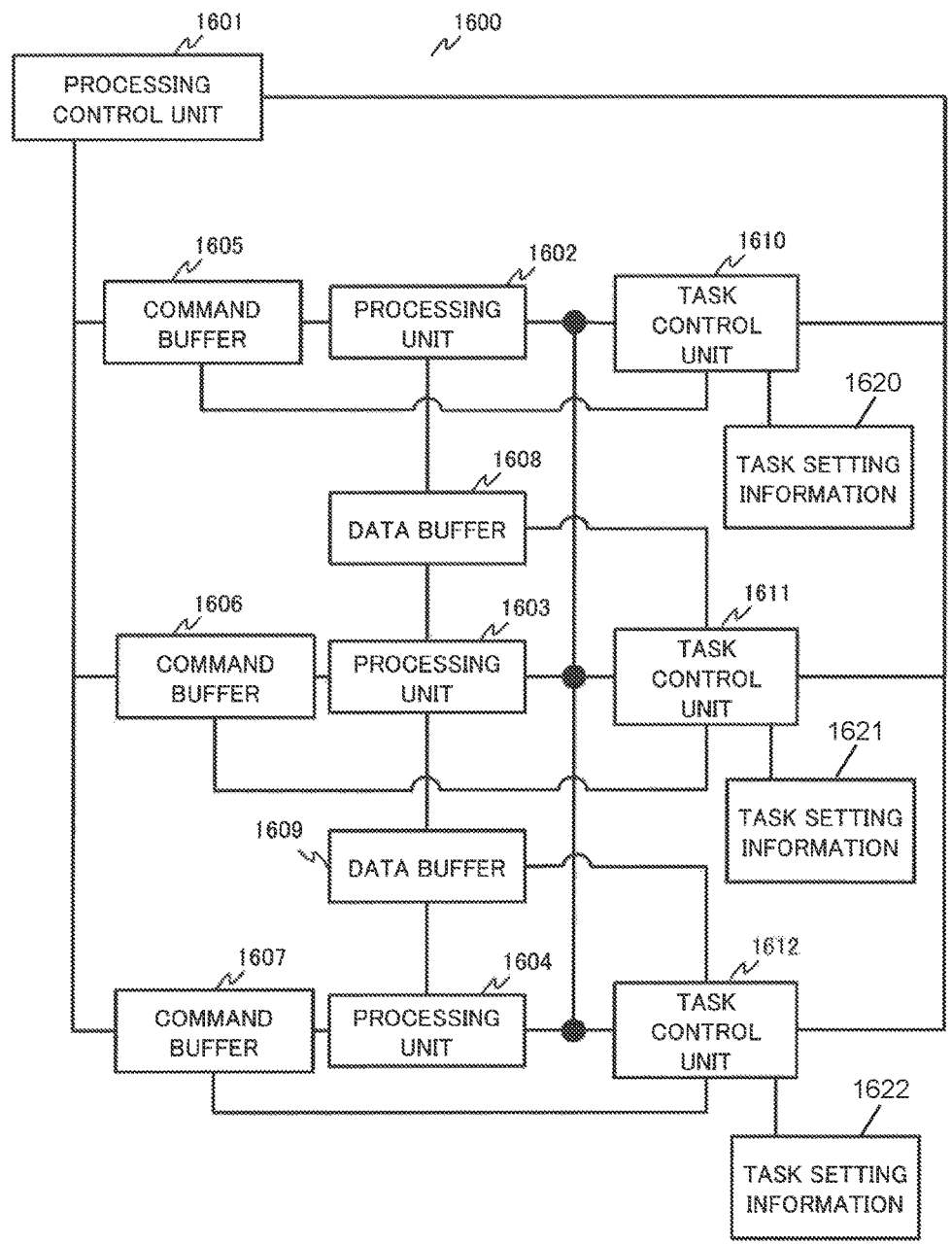
FIG. 16 is a diagram exemplifying a functional configuration of a processing device according to a fifth example embodiment of the present invention.

As exemplified in FIG. 16, a processing device 1600 in the present example embodiment includes a processing control unit 1601, a plurality of processing units (1602, 1603, and 1604 in FIG. 16), a plurality of data buffers (1608 and 1609 in FIG. 16), and a plurality of task control units (1610, 1611, and 1612 in FIG. 16). The processing device 1600 in the present example embodiment may further include command buffers (1605, 1606, and 1607 in FIG. 16). Hereinafter, the respective constituent elements will be described.

Each of the processing units (1602 to 1604) is an operational processing apparatus that executes certain operational processing on data. Such operational processing, which is executed in the processing units (1602 to 1604), is any type of processing and may be, for example, processing related to various types of signal processing, such as FFT and filtering. The processing units (1602 to 1604) may be configured similar to the processing units (104, 105, and 106) in the first example embodiment.

Each of the data buffers (1608 and 1609) is connected between a first processing unit (preceding processing unit) and a second processing unit (succeeding processing unit) among a plurality of the processing units. Each of the data buffers (1608 and 1609) is capable of storing data output from the first processing unit and data supplied to the second processing unit. Each of the data buffers (1608 and 1609) may be connected between, for example, the output side of the first processing unit and the input side of the second processing unit.

More specifically, the data buffer 1608 is connected between the processing units 1602 and 1603 and stores output data from the processing unit 1602 and input data to the processing unit 1603. In this case, it can be considered that, for example, the processing units 1602 and 1603 correspond to the first processing unit and the second processing unit, respectively.

Similarly, the data buffer 1609 is connected between the processing units 1603 and 1604 and stores output data from the processing unit 1603 and input data to the processing unit 1604. In this case, it can be considered that, for example, the processing units 1603 and 1604 correspond to the first processing unit and the second processing unit, respectively.

As described above, a second processing unit (for example, the processing unit 1603) for particular data buffer (for example, the data buffer 1608) may be a first processing unit for another data buffer (for example, the data buffer 1609).

The data buffers (1608 and 1609) may be configured similar to the data buffers (110 and 111) in the first example embodiment.

The processing control unit 1601 generates task commands, each of which specifies execution of a task that is executed in at least one or more of the first processing units and one or more of the second processing units. Such a task is a series of operational processing that is executed on the data.

The processing control unit 1601 may input the task commands to the respective command buffers (1605 to 1607) and the respective task control units (1610 to 1612), which will be described later. The processing control unit 1601 may be configured similar to the processing control unit 101 in the first example embodiment.

The command buffers (1605 to 1607) store the task commands, which are supplied from the processing control unit 1601, and are configured to be able to output stored data to at least any of the processing units (1602 to 1604).

The command buffers in the present example embodiment may be communicatively connected to the respective processing units (1602 to 1604) in a, as exemplified in FIG. 16. The command buffer in the present example embodiment may be connected to a particular one of the processing units (for example, 1602), as exemplified in FIG. 17.

The command buffers (1605 to 1607) may be configured similar to the command buffers (107 to 109) in the first example embodiment.

The task control units (1610 to 1612) control operational processing in the tasks, which are executed in the at least any of the processing units, on the basis of the task commands, task setting information (1620 to 1622), and status information of the respective processing units (1602 to 1604).

The task setting information (1620 to 1622) enables to identify the processing units (1602 to 1604) in which a task is executed, with respect to the task. The status information represents states of operational processing in the respective processing units (1602 to 1604). The task control unit 1610 acquires the status information from each of a plurality of the processing units (1602 to 1604).

The task control units (1610 to 1612) may be configured similar to the task control units (112, 113, and 114) in the first example embodiment.

The processing device 1600 in the present example embodiment, which is configured as described above and includes the plurality of processing units (1602 to 1604) being connected in a pipeline form through the data buffers (1608 to 1609), is able to control execution of the task so that the respective processing units (1602 to 1604) can be operated efficiently. That is, when executing tasks in which processing is executed in a pipeline by use of the plurality of processing units (1602 to 1604), the processing device 1600 is able to reduce an idle state and latency in the respective processing units.

Specifically, the processing device 1600 is capable of executing operational processing in a task in particular processing units, before operational processing in another task executed in another particular processing unit is finished. That is because execution of a task is controlled with respect to each processing unit, based on the execution states (statuses) of the respective processing units (1602 to 1604) and setting information of respective tasks.

Figure 17:
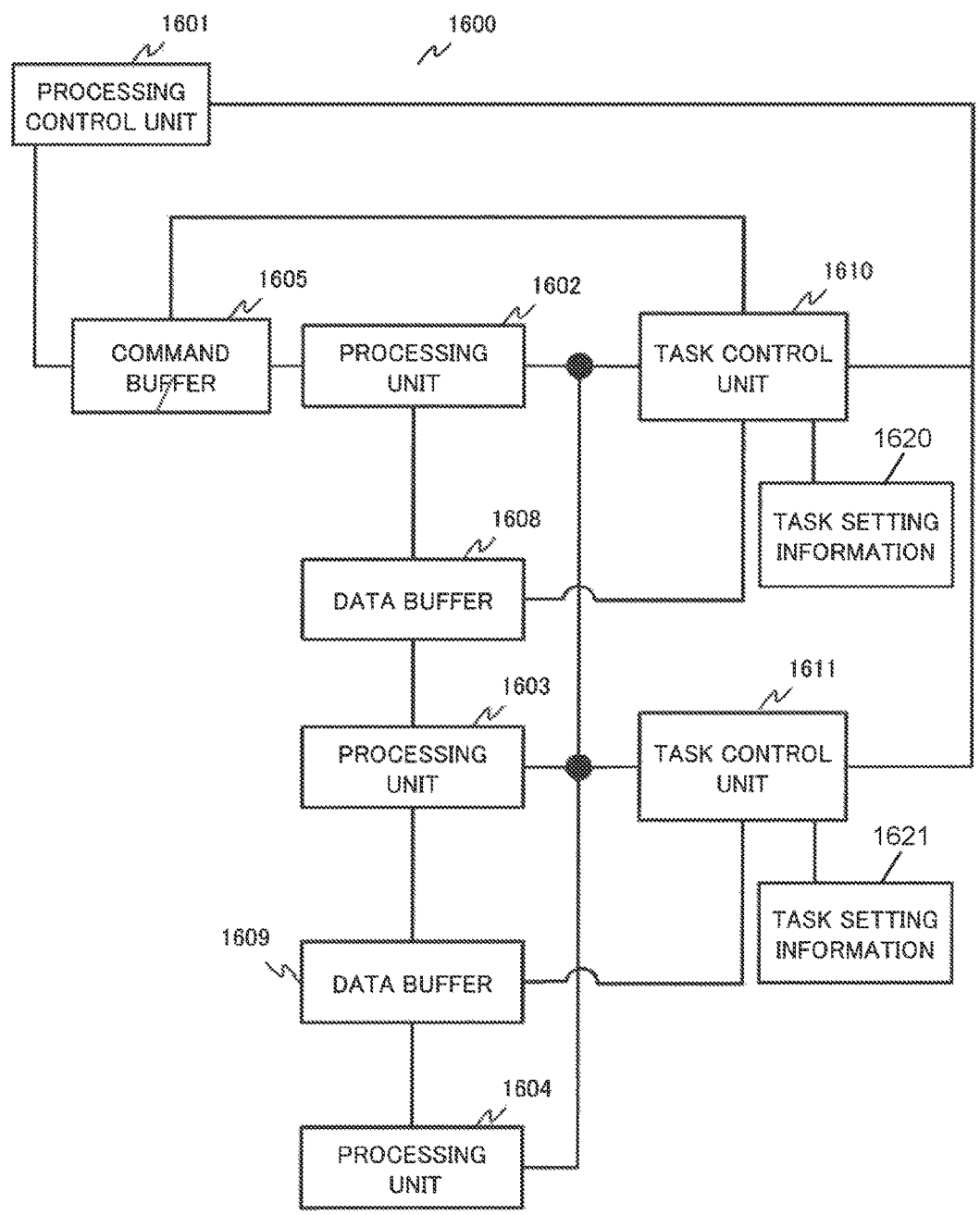
FIG. 17 is a diagram exemplifying another configuration of the processing device according to the fifth example embodiment of the present invention.

Configurations exemplified in FIGS. 16 and 17 are typical examples of a configuration by which the processing device in the present example embodiment can be achieved, and the present example embodiment is not limited to the configurations. That is, the number of processing units in the present example embodiment may be defined suitably. The numbers of data buffers and task control units may also be chosen in an appropriately based on the number of processing units.

<Configuration of Hardware and Software Program (Computer Program)>

Hereinafter, a hardware configuration by which the above-described respective example embodiments can be achieved will be described. In the following description, configurations of the task control units (112 to 114, 1101 to 1103, 1303 and 1304, and 1610 to 1612) will be particularly described. Hereinafter, the above task control units may be collectively referred to as "task control units".

Task control units in the processing devices (100, 1100, 1300, and 1600) described in the above-described respective example embodiments may be configured by a dedicated hardware device. In this case, respective units illustrated in the above-described respective drawings may be achieved as hardware (an integrated circuit in which processing logic is implemented, and the like) into which a portion or all of the units are integrated.

Figure 19:
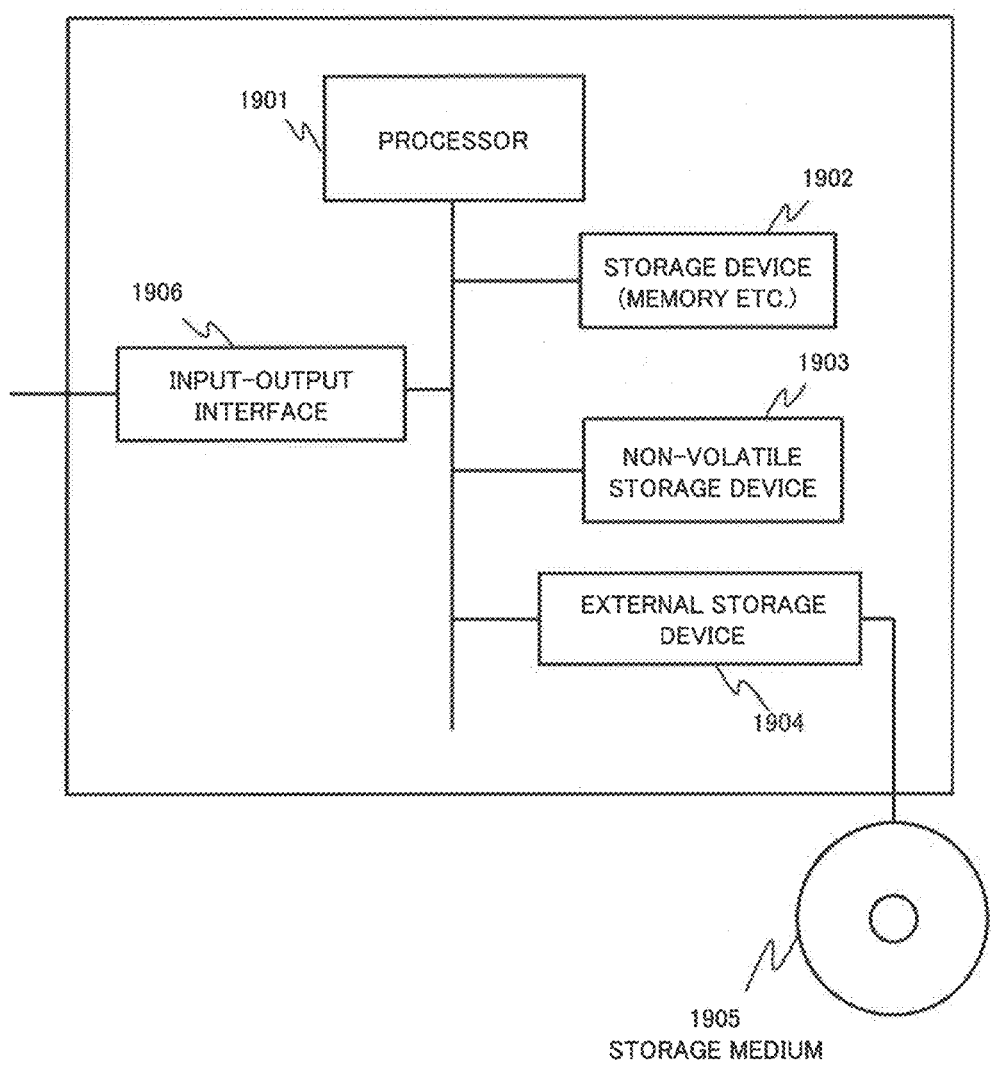
FIG. 19 is a diagram exemplifying a hardware configuration by which control units according to the respective example embodiments of the present invention are achievable.
Figure 20:
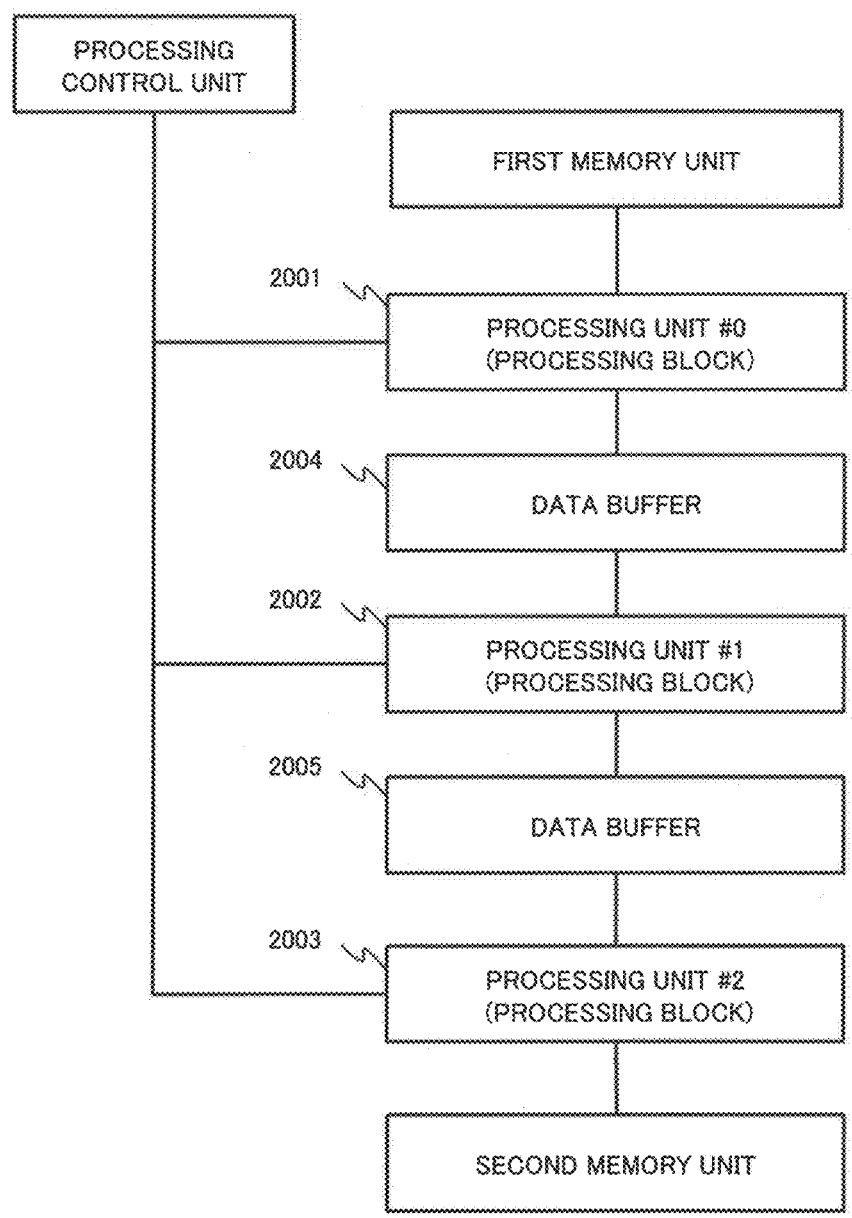
FIG. 20 is a diagram exemplifying a functional configuration of a processing device that is a technique related to the present invention.
Figure 21:
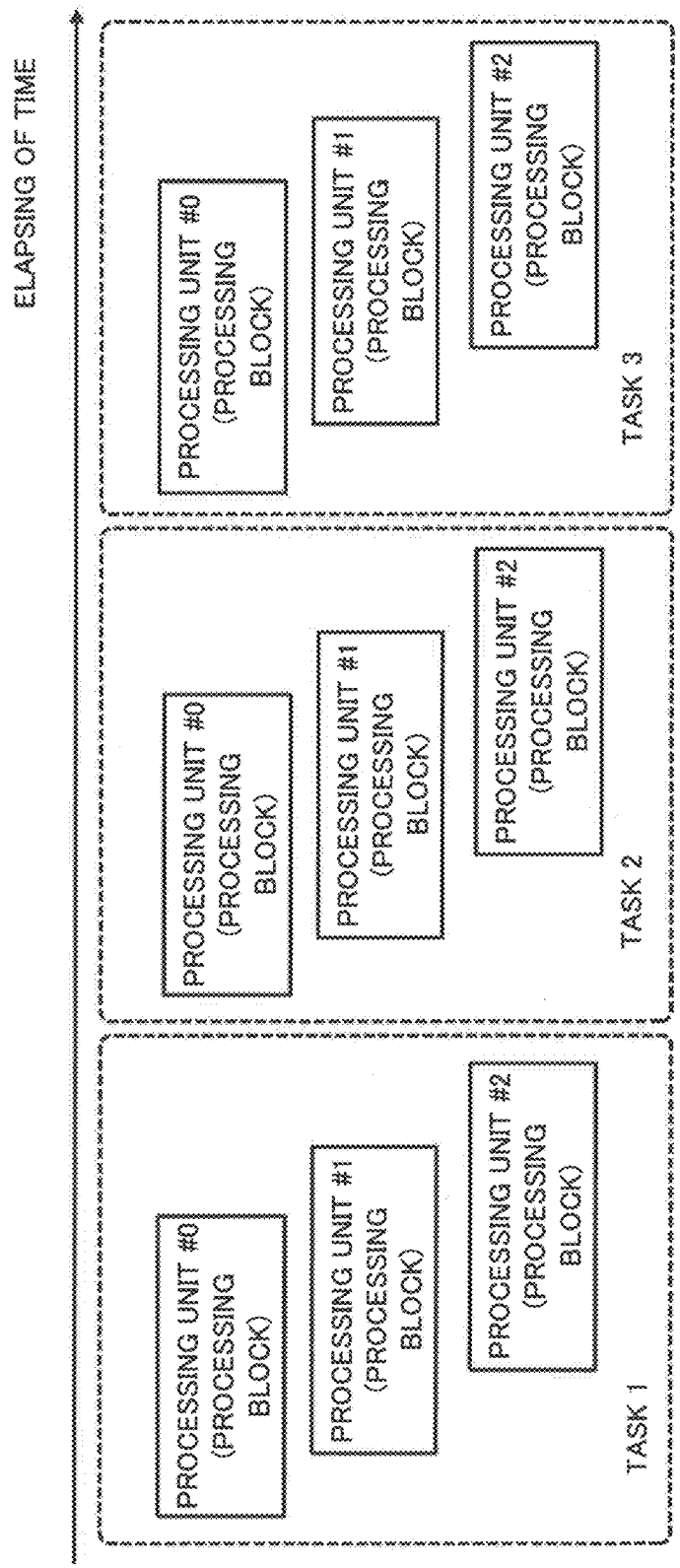
FIG. 21 is a diagram schematically illustrating an execution process of a task in the processing device as a technique related to the present invention.

The task control units may also be configured with hardware as exemplified in FIG. 19 and various software programs (computer programs) that are executed by such hardware.

A processor 1901 in FIG. 19 is a processing device, such as a general-purpose CPU (Central Processing Unit) and a microprocessor. The processor 1901 may, for example, read various software programs stored in a non-volatile storage device 1903, which will be described later, into a memory 1902 and execute processing in accordance with the software programs.

The memory 1902 is a memory device, such as RAM (Random Access Memory) that can be referenced from the processor 1901 and stores software programs, various data and the like. The memory 1902 may also be a volatile memory device.

The non-volatile storage device 1903 is a non-volatile storage device, such as ROM (Read Only Memory) and flash memory configured with a semiconductor storage device, and may record various software programs and data and the like.

An external storage device 1904 is, for example, a device that processes reading and writing of data from/to a storage medium 1905, which will be described later.

The storage medium 1905 is, for example, any type of recording medium that is capable of recording data, such as an optical disc, a magneto-optical disc, and semiconductor flash memory.

An input-output interface 1906 is a device that controls input and output between a task control unit and other constituent elements in each of the processing devices (100, 1100, 1300, and 1600), which were described in the above-described respective example embodiments. The input-output interface 1906 may be a network interface that is connectable to various communication networks.

For example, in the above-described respective example embodiments, the task control unit and other constituent elements in each of the processing devices (100, 1100, 1300, and 1600), which were described in the above-described respective example embodiments, may be connected to each other through any communication bus by way of the input-output interface 1906.

The present invention, which was described using the above-described respective example embodiments as examples, may be achieved by, for example, configuring a task control unit using hardware devices exemplified in FIG. 19 and providing the task control unit with a software program by which functions, which were described in the above-described respective example embodiments, can be achieved. In this case, the present invention may be achieved by the processor 1901 executing the software program provided to the task control unit.

In the above-described respective example embodiments, the respective units illustrated in the above-described respective drawings can be achieved as software modules, which are functional (processing) units of the software program, which is executed by the above-described hardware. However, division of the respective software modules illustrated in these drawings is made for the purpose of description, and various configurations are conceivable when being implemented.

For example, when the task control units exemplified in FIGS. 1, 11, 13, and 16 are achieved as software modules, it may be configured that the software modules are stored in the non-volatile storage device 1903, and, when the processor 1901 executes respective processing, read into the memory 1902.

The software modules may be configured in such a way as to be able to transmit various data to one another by an appropriate method, such as a shared memory and an inter-process communication. Using such a configuration enables the software modules to be connected in a communicative manner with one another.

Furthermore, it may be configured in such a way that the respective software programs are stored in the storage medium 1905, and, at a shipping stage, an operation stage, or the like of the processing device (100, 1100, 1300, or 1600), the software programs are stored into the non-volatile storage device 1903 by way of the external storage device 1904 in an appropriate manner.

In the above-described case, as a method of providing various software programs to the task control unit, a method of installing the various software programs into the processing device (100, 1100, 1300, or 1600) using an appropriate tools at a production stage before shipping, a maintenance stage after shipping, or the like may be employed. As a method of providing various software programs, procedures popular in the present day, which includes a method of downloading the various software programs from the outside by way of a communication line, such as the Internet, may also be employed.

In such a case, the present invention can be considered to be configured with codes constituting the software programs or a computer-readable storage medium in which the codes are recorded.

The present invention was described above as examples in which the present invention is applied to the above-described typical example embodiments. However, the technical scope of the present invention is not limited to the scope described in the above-described respective example embodiments. It is apparent for a person skilled in the art that various modifications or improvements can be applied to the example embodiments. In such a case, new example embodiments to which the modifications or improvements are applied may also be included in the technical scope of the present invention. This is apparent from the matters stated in the claims.

INDUSTRIAL APPLICABILITY

The present invention is applicable to, for example, a processing device that executes operational processing using a plurality of processing units in a pipeline manner. More specifically, the present invention is applicable to a processing device used for signal processing, such as wireless signal processing and image processing.

This application claims priority based on Japanese Patent Application No. 2014-125942, filed on Jun. 19, 2014, the entire disclosure of which is incorporated herein by reference.

REFERENCE SIGNS LIST

100 Processing device
101 Processing control unit
102 First memory unit
103 Second memory unit
104, 105, 106 Processing unit
107, 108, 109 Command buffer
110, 111 Data buffer
112, 113, 114 Task control unit
1100 Processing device
1101, 1102, 1103 Task control unit
1301 Processing control unit
1302 Command buffer
1303, 1304 Task control unit
1305, 1306 Data buffer
1307, 1308, 1309 Processing unit
1600 Processing device
1601 Processing control unit
1602, 1603, 1604 Processing unit
1605, 1606, 1607 Command buffer
1608, 1609 Data buffer
1610, 1611, 1612 Task control unit
1901 Processor
1902 Memory
1903 Non-volatile storage device
1904 External storage device
1905 Storage medium
1906 Input-output interface

The invention claimed is:

1. A processing apparatus, comprising:
a plurality of processing units that are configured to execute operational processing on data;

at least one or more data buffers that are connected between a first processing unit and a second processing unit among the plurality of processing units and configured to store a result output from the first processing unit and inputs the result to the second processing unit as data for the second processing unit;

a command buffer that stores a task command specifying execution of a task that is a series of operational processing on the data, the task being executed in one or more specific processing units that are at least any of one or more of the first processing unit and one or more of the second processing unit, the command buffer being able to output the task command to the one or more specific processing units;

a task control unit comprising circuitry that is configured to be connected to the plurality of processing units, receive information that represents a state of operational processing in each of the processing units of the plurality of processing units, and control operational processing of the task that is executed in the one or more specific processing units, by controlling output of the task command from the command buffer to the one or more specific processing units, on the basis of the task command, task setting information that identifies the processing unit in which the task is to be executed, and the information received from the plurality of processing units, wherein the task setting information includes, with respect to each task, information that identifies a start processing unit that is configured to execute first operational processing of the task, and an end processing unit that is configured to execute last operational processing of the task; and a processing control unit that generates the task command, supplies the task command to the command buffer, and supplies the task command to the task control unit;

wherein the task control unit, on the basis of information representing states of the operational processing executed in the start processing unit and the end processing unit, determines whether the task is executable in a controlled processing unit, wherein the controlled processing unit being the one or more specific processing units among the plurality of processing units, and is being controlled by the task control unit, by confirming whether processing has finished in a processing unit preceding the controlled processing unit, wherein the task command includes task dependency information that represents a dependent task that is dependent on the task, which is specified by the task command, in execution order, and the task control unit, on the basis of the task setting information, when determines that the controlled processing unit is the start processing unit for the task specified by the task command, confirms whether or not the dependent task, which is set to be executed before the task exists, according to the task dependency information included in the task command regarding the task, and when the dependent task does not exist, controls the controlled processing unit to execute operational processing of the task.

2. The processing apparatus according to claim 1, wherein the task control unit controls a start timing of operational processing of the task in the one or more specific processing units by controlling output of the task command from the command buffer to the one or more specific processing units.

3. The processing apparatus according to claim 1, wherein,
when operational processing in the task executed in the first processing unit is finished, the first processing unit outputs the result of the task to the data buffer connected to an output side of the first processing unit, the data buffer connected to the output side of the first processing unit stores the result being output, and the task control unit controls a start timing of operational processing of the task in the second processing unit, by controlling output of the data from the data buffer to the second processing unit, the data buffer being connected to the input side of the second processing unit.

4. The processing apparatus according to claim 1, wherein the task setting information includes, with respect to each task, information that identifies the start processing unit that is the processing unit executing the first operational processing of the task and a processing unit count that is information representing the number of processing units used for the series of operational processing in the task, and the task control unit,
with respect to each task, identifies the end processing unit that executes the last operational processing of the task on the basis of the information that identifies the start processing unit and the processing unit count, and on the basis of the information representing the states of the operational processing executed in the start processing unit and the identified end processing unit, determines whether the specific task is executable in the controlled processing unit that is the one or more specific processing units among the plurality of processing units, and is controlled by the task control unit.

5. The processing apparatus according to claim 1, wherein when the task control unit determines that the processing unit controlled by the task control unit is the start processing unit for the task on the basis of the task setting information, the task control unit confirms whether there is the dependent task with a dependency to be executed before the task, on the basis of the task dependency information included in the task command specifying execution of the task, when, as a result of the confirmation, the dependent task exists, the task control unit identifies the end processing unit for the dependent task with the dependency on the basis of the task setting information, and confirms whether operational processing of the dependent task in the identified end processing unit has finished, on the basis of the information representing the state of operational processing in the identified end processing unit, and when the operational processing in the identified end processing unit finishes, the task control unit controls the control buffer to output the task command for the task and the data buffer to output the data to the controlled processing unit.

6. The processing apparatus according to claim 1, wherein the task setting information includes, with respect to each task, information that identifies the start processing unit that is configured to execute the first operational processing of the task, and the end processing unit that is configured to execute the last operational processing of the task, and the task control unit, on the basis of a result of determining whether the controlled processing unit, which is the one or more specific processing units among the plurality of processing units and is controlled by the task control unit, is the start processing unit, and the information representing states of the operational processing executed in the end processing unit, determines whether the task is executable in the controlled processing unit.

7. The processing apparatus according to claim 1, wherein the task setting information includes, with respect to each task, the information that identifies the start processing unit that is the processing unit executing the first operational processing of the task and a processing unit count that is information representing the number of processing units used for a series of operational processing in the task, and the task control unit, with respect to each task, identifies the end processing unit that executes the last operational processing of the task on the basis of the information that identifies the start processing unit and the processing unit count, and on the basis of a result of determining whether the controlled processing unit, which is the one or more specific processing units among the plurality of processing units and is controlled by the task control unit, is the start processing unit, and the information representing states of the operational processing executed in the end processing unit, determines whether the task is executable in the controlled processing unit.

8. A control method of a processing apparatus comprising one or more processing units and one or more data buffers, the method comprising:

storing a result output from a first processing unit and inputting the result to a second processing unit in the data buffer as data for the second processing unit, the data buffer connected between the first processing unit and the second processing unit, when both of the first processing unit and the second processing unit are the processing unit that is configured to execute operational processing on the data;

storing a task command specifying execution of a task that is a series of operational processing on the data, the task being executed in one or more specific processing unit that are at least any of the one or more first processing unit and the one or more second processing unit, to a command buffer;

receiving information that represents a state of operational processing in each of the processing units from the one or more processing units;

outputting, from the command buffer, the task command to the specific processing unit; and controlling operational processing of the task that is executed in the one or more specific processing units, by controlling output of the task command from the command buffer to the specific processing unit, on the basis of the task command, task setting information that identifies the processing unit in which the task is to be executed, and the information, received from the one or more processing units, wherein the task setting information includes, with respect to each task, information that identifies a start processing unit that is configured to execute first operational processing of the task, and an end processing unit that is configured to execute last operational processing of the task; and processing for generating the task command, supplying the task command to the command buffer, and supplying the task command for storing at the task control unit;

on the basis of the information representing the states of the operational processing executed in the start processing unit and the end processing unit, determining whether the task is executable in a controlled processing unit, wherein the controlled processing unit being the one or more specific processing unit among the plurality of processing units, by confirming whether processing has finished in a processing unit preceding the controlled processing unit, wherein the task command includes task dependency information that represents a dependent task that is dependent on the task, which is specified by the task command, in execution order, and on the basis of the task setting information, when it is determined that the controlled processing unit is the start processing unit for the task specified by the task command, confirming whether or not the dependent task, which is set to be executed before the task exists, according to the task dependency information included in the task command regarding the task, and when the dependent task does not exist, controlling to execute operational processing of the task.

9. A non-transitory computer readable storage medium storing a computer program for a processing apparatus comprising one or more processing units and one or more data buffers, the program making the processing apparatus to execute:

processing for storing a result output from a first processing unit and inputting the result to a second processing unit as data for the second processing unit in a data buffer that is connected between the first processing unit and the second processing unit, where both of the first processing unit and the second processing unit are the processing unit that is configured to execute operational processing on the data;

processing for storing a task command specifying execution of a task that is a series of operational processing on the data, the task being executed in one or more specific processing units that are at least any of one or more first processing unit and one or more second processing unit, to a command buffer;

processing for outputting, from the command buffer, the task command to the one or more specific processing units; and processing for receiving information that represents a state of operational processing in each of the processing units from the one or more processing units;

processing for controlling operational processing of the task that is executed in the one or more specific processing units, by controlling output of the task command from the command buffer to the specific processing unit, on the basis of the task command, task setting information that identifies the processing unit in which the task is to be executed, and the information received from the one or more specific processing units, wherein the task setting information includes, with respect to each task, information that identifies a start processing unit that is configured to execute first operational processing of the task, and an end processing unit that is configured to execute last operational processing of the task; and processing for generating the task command, supplying the task command to the command buffer, and supplying the task command for processing;

on the basis of the information representing the states of the operational processing executed in the start processing unit and the end processing unit, determining whether the task is executable in a controlled processing unit, wherein the controlled processing unit being the one or more specific processing units among the plurality of processing units, by confirming whether processing has finished in a processing unit preceding the controlled processing unit, wherein the task command includes task dependency information that represents a dependent task that is dependent on the task, which is specified by the task command, in execution order, and on the basis of the task setting information, when it is determined that the controlled processing unit is the start processing unit for the task specified by the task command, confirming whether or not the dependent task, which is set to be executed before the task exists, according to the task dependency information included in the task command regarding the task, and when the dependent task does not exist, controlling to execute operational processing of the task.

* * * * *